United States Patent
Kim et al.

(10) Patent No.: US 10,339,722 B2
(45) Date of Patent: Jul. 2, 2019

(54) DISPLAY DEVICE AND CONTROL METHOD THEREFOR

(71) Applicant: Samsung Electronics Co., Ltd., Suwon-si, Gyeonggi-do (KR)

(72) Inventors: Do-wan Kim, Suwon-si (KR); Eun-kyo Baek, Seoul (KR); Han-il Yu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/569,642

(22) PCT Filed: Dec. 4, 2015

(86) PCT No.: PCT/KR2015/013250
§ 371 (c)(1),
(2) Date: Oct. 26, 2017

(87) PCT Pub. No.: WO2016/175418
PCT Pub. Date: Nov. 3, 2016

(65) Prior Publication Data
US 2018/0130262 A1    May 10, 2018

(30) Foreign Application Priority Data
Apr. 29, 2015    (KR) .................. 10-2015-0060536

(51) Int. Cl.
*G09G 3/00*    (2006.01)
*G06T 15/20*    (2011.01)
(Continued)

(52) U.S. Cl.
CPC .......... *G06T 19/20* (2013.01); *G06T 15/205* (2013.01); *G09G 3/001* (2013.01); *H04N 13/128* (2018.05);
(Continued)

(58) Field of Classification Search
CPC .......... G06T 19/20; G06T 3/40; G06T 7/593; G02B 27/22; G02B 27/2228; G06F 2203/04806; G06F 3/017; G09G 2340/045
See application file for complete search history.

(56) References Cited

U.S. PATENT DOCUMENTS 9,036,012 B2    5/2015    Lee et al.
9,063,649 B2    6/2015    Kim
(Continued)

FOREIGN PATENT DOCUMENTS

JP    H08-160349 A    6/1996
JP    H08-223609 A    8/1996
(Continued)

OTHER PUBLICATIONS

Korean Office Action dated Apr. 15, 2019, issued in Korean Patent Application No. 10-2015-0060536.

*Primary Examiner* — Haixia Du
(74) *Attorney, Agent, or Firm* — Jefferson IP Law, LLP

(57) ABSTRACT

A display device for providing a virtual reality service is provided. The display device includes: a display configured to display a stereoscopic image; a user interface configured to receive a user command for enlarging or shrinking the stereoscopic image; and a processor configured to adjust a three-dimensional effect for the stereoscopic image to correspond to the user command when the user command is input, and control the display to display an enlarged image or a shrunk image in which the three-dimensional effect is adjusted.

12 Claims, 14 Drawing Sheets

(51) Int. Cl.
*G06T 19/20* (2011.01)
*H04N 13/128* (2018.01)
*H04N 13/344* (2018.01)
*H04N 13/398* (2018.01)

(52) U.S. Cl.
CPC ......... *H04N 13/344* (2018.05); *H04N 13/398* (2018.05); *G06T 2200/04* (2013.01); *G06T 2200/24* (2013.01); *G06T 2219/2016* (2013.01); *H04N 2213/008* (2013.01)

(56) References Cited

U.S. PATENT DOCUMENTS

| | | | |
|---|---|---|---|
| 2005/0053274 A1* | 3/2005 | Mayer | G03B 21/18 382/154 |
| 2012/0050502 A1* | 3/2012 | Chi | H04N 13/398 348/51 |
| 2012/0127273 A1 | 5/2012 | Zhang et al. | |
| 2014/0002452 A1* | 1/2014 | Levin | H04N 13/0246 345/419 |
| 2014/0015941 A1 | 1/2014 | Park et al. | |
| 2015/0163475 A1* | 6/2015 | Krisman | H04N 13/0022 348/54 |

FOREIGN PATENT DOCUMENTS

| | | |
|---|---|---|
| JP | 2013-232744 A | 11/2013 |
| KR | 10-2003-0048013 A | 6/2003 |
| KR | 10-0662248 B1 | 12/2006 |
| KR | 10-0713024 B1 | 4/2007 |
| KR | 10-0947366 B1 | 4/2010 |
| KR | 10-2012-0020801 A | 3/2012 |
| KR | 10-2012-0027817 A | 3/2012 |
| KR | 10-2012-0055991 A | 6/2012 |
| KR | 10-2014-0007708 A | 1/2014 |
| KR | 10-2015-0029216 A | 3/2015 |
| WO | 02/15595 A1 | 2/2002 |
| WO | 2006/110009 A1 | 10/2006 |

\* cited by examiner

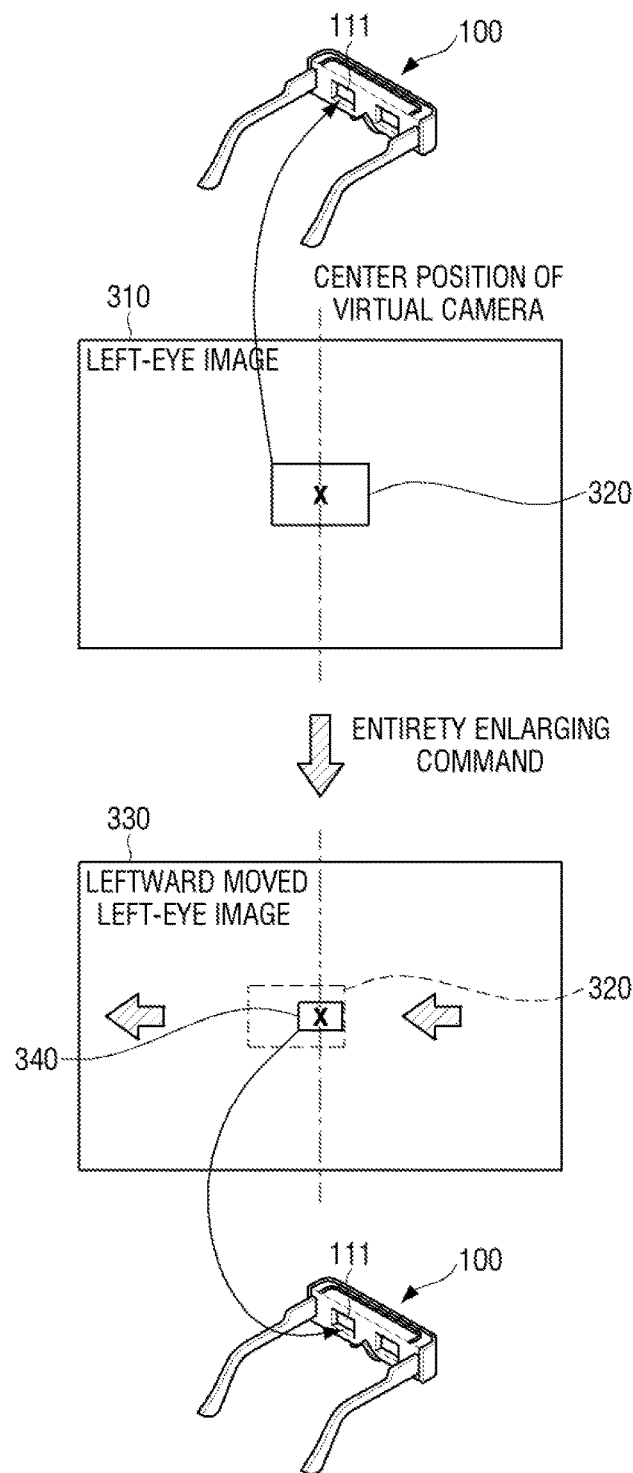

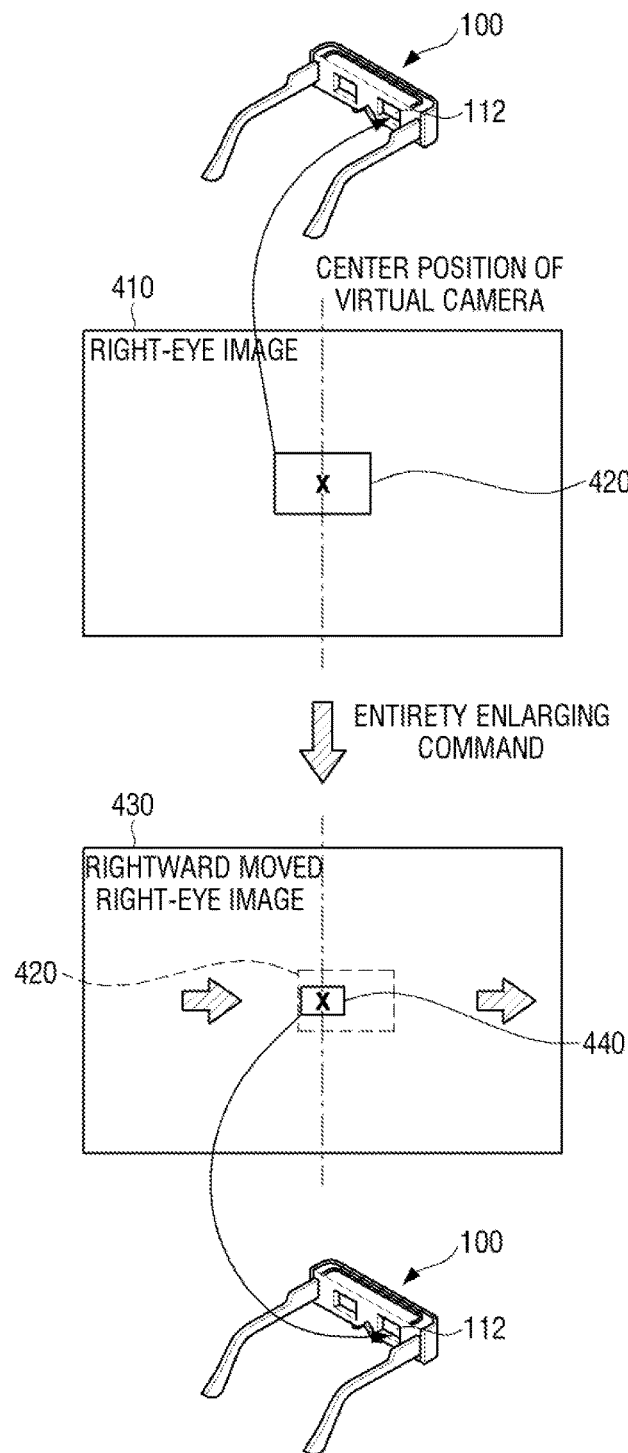

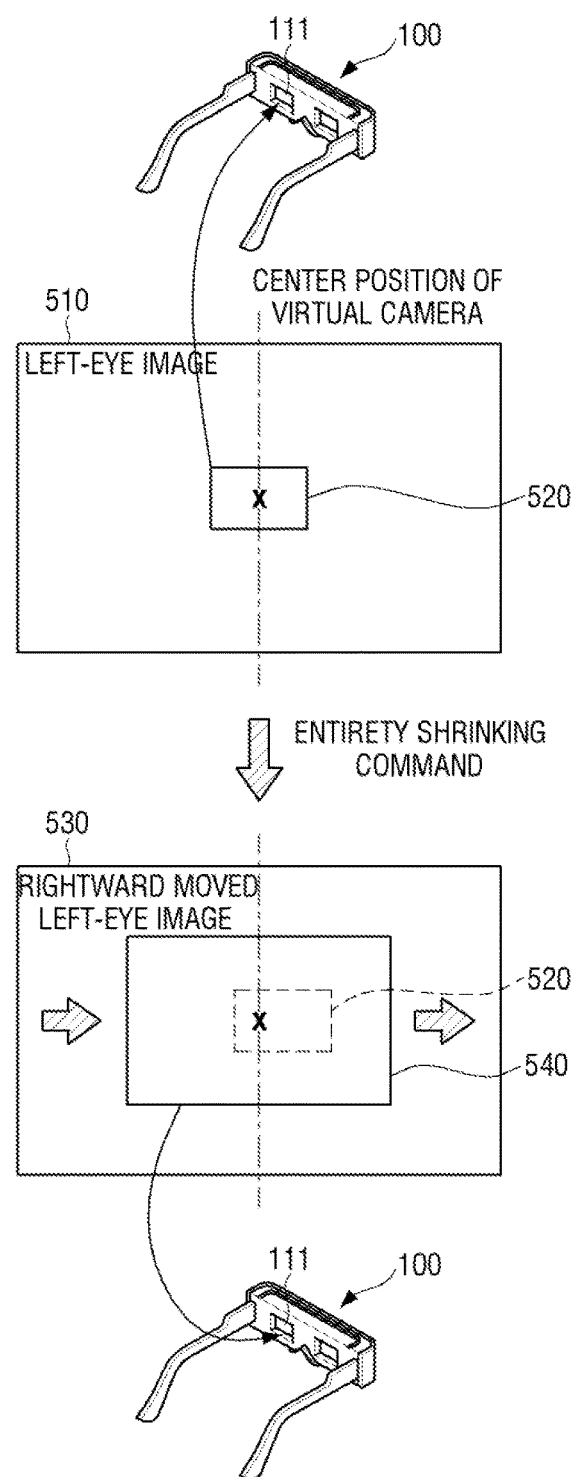

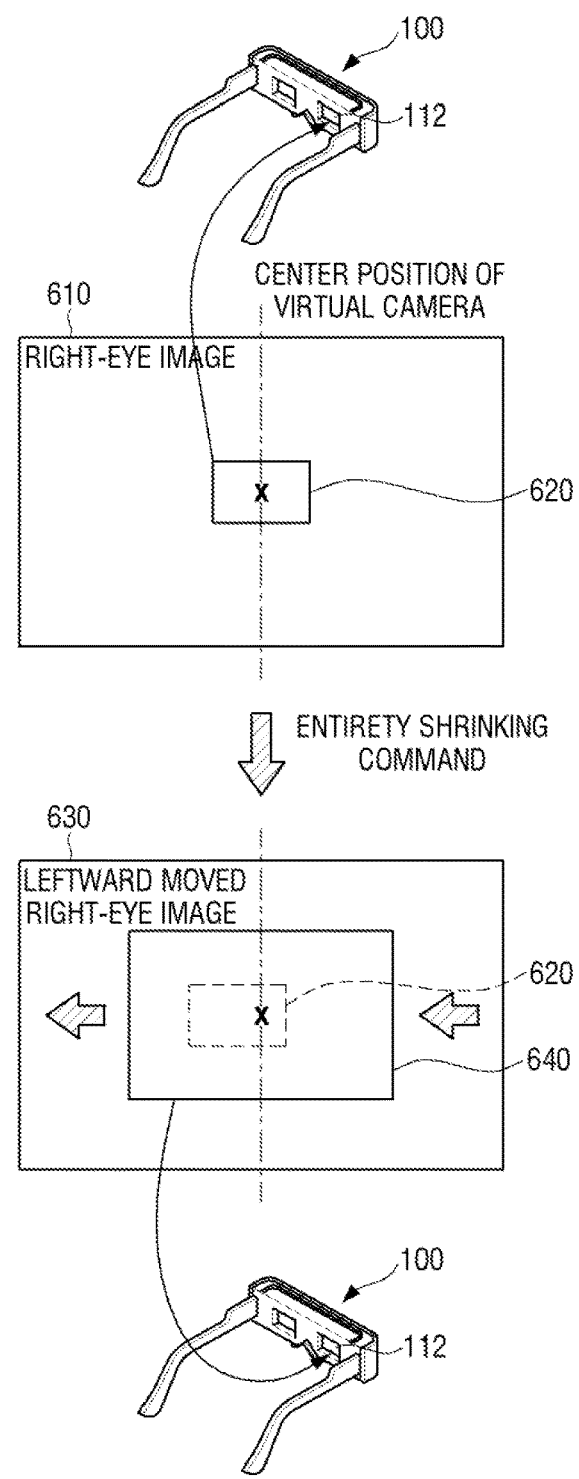

DISPLAY DEVICE AND CONTROL METHOD THEREFOR

TECHNICAL FIELD

Apparatuses and methods consistent with the present disclosure relate to a display device and a control method thereof, and more particularly, to a display device capable of providing a virtual reality service, and a control method thereof.

BACKGROUND ART

Recently, in accordance with the development of electronic technology, users could receive three-dimensional (3D) images through head mounted displays (HMDs).

In this case, the user could receive a 3D image for a direction that he/she views depending on movement of his/her head to feel a more realistic 3D image unlike an existing monitor or television (TV).

However, in the case of enlarging or shrinking the 3D image, a disparity between a left-eye image and a right-eye image is excessively increased, such that a cross talk phenomenon occurs, or a disparity between a left-eye image and a right-eye image is decreased, such that an unnatural image is provided to the user.

DISCLOSURE

Technical Problem

The present disclosure provides a display device capable of generating and providing an enlarged image and a shrunk image in which a three-dimensional effect is adjusted at the time of enlarging or shrinking a stereoscopic image, and a control method thereof.

Technical Solution

According to an aspect of the present disclosure, a display device for providing a virtual reality service includes: a display configured to display a stereoscopic image; a user interface configured to receive a user command for enlarging or shrinking the stereoscopic image; and a processor configured to adjust a three-dimensional effect for the stereoscopic image to correspond to the user command and control the display to display an enlarged image or a shrunk image in which the three-dimensional effect is adjusted, when the user command is input.

The processor may move each of a left-eye image and a right-eye image included in the stereoscopic image, project each of the moved left-eye image and right-eye image into a virtual stereoscopic space to generate a left-eye stereoscopic space image and a right-eye stereoscopic space image, extract images corresponding to the user command from each of the left-eye stereoscopic space image and the right-eye stereoscopic space image, and display the extracted images.

The processor, when the entirety enlarging command to enlarge an entirety of the stereoscopic image is input, may move the left-eye image leftward, move the right-eye image rightward, generate the left-eye stereoscopic space image and the right-eye stereoscopic space image using each of the leftward moved left-eye image and the rightward moved right-eye image, extract enlarged images corresponding to the entirety enlarging command from each of the left-eye stereoscopic space image and the right-eye stereoscopic space image, and display the extracted images.

The processor, when an entirety enlarging command to enlarge an entirety of the stereoscopic image is input, may move the left-eye image rightward, move the right-eye image leftward, generate the left-eye stereoscopic space image and the right-eye stereoscopic space image using each of the rightward moved left-eye image and the leftward moved right-eye image, extract shrunk images corresponding to the entirety shrinking command from each of the left-eye stereoscopic space image and the right-eye stereoscopic space image, and display the extracted images.

The processor may project each of a left-eye image and a right-eye image included in the stereoscopic image into a virtual stereoscopic space to generate a left-eye stereoscopic space image and a right-eye stereoscopic space image, rotate virtual cameras existing in the left-eye stereoscopic space and the right-eye stereoscopic space, extract images corresponding to the user command from each of the left-eye stereoscopic space image and the right-eye stereoscopic space image using the rotated virtual cameras, and display the extracted images.

The processor, when a portion enlarging command to enlarge a portion of the stereoscopic image is input, may rotate the virtual camera existing in the left-eye stereoscopic space image rightward, rotate the virtual camera existing in the right-eye stereoscopic space image leftward, extract images corresponding to the portion enlarging command from each of the left-eye stereoscopic space image and the right-eye stereoscopic space image using the rotated virtual cameras, and display the extracted images to be overlaid on the left-eye image and the right-eye image, respectively.

The processor, when a portion shrinking command to shrink a portion of the stereoscopic image is input, may rotate the virtual camera existing in the left-eye stereoscopic space image leftward, rotate the virtual camera existing in the right-eye stereoscopic space image rightward, extract images corresponding to the portion shrinking command from each of the left-eye stereoscopic space image and the right-eye stereoscopic space image using the rotated virtual cameras, and display the extracted images to be overlaid on the left-eye image and the right-eye image, respectively.

According to another aspect of the present disclosure, a control method of a display device for providing a virtual reality service includes: displaying a stereoscopic image; and adjusting a three-dimensional effect for the stereoscopic image to correspond to a user command for enlarging or shrinking the stereoscopic image and displaying an enlarged image or a shrunk image in which the three-dimensional effect is adjusted, when the user command is input.

The displaying of the enlarged image or the shrunk image may include moving each of a left-eye image and a right-eye image included in the stereoscopic image, projecting each of the moved left-eye image and right-eye image into a virtual stereoscopic space to generate a left-eye stereoscopic space image and a right-eye stereoscopic space image, extracting images corresponding to the user command from each of the left-eye stereoscopic space image and the right-eye stereoscopic space image, and displaying the extracted images.

The displaying of the enlarged image or the shrunk image may include, when an entirety enlarging command to enlarge an entirety of the stereoscopic image is input, moving the left-eye image leftward, moving the right-eye image rightward, generating the left-eye stereoscopic space image and the right-eye stereoscopic space image using each of the leftward moved left-eye image and the rightward moved right-eye image, extracting enlarged images corresponding the an entirety enlarging command from each of the left-eye stereoscopic space image and the right-eye stereoscopic space image, and displaying the extracted images.

The displaying of the enlarged image or the shrunk image may include, when the entirety enlarging command to enlarge an entirety of the stereoscopic image is input, moving the left-eye image rightward, moving the right-eye image leftward, generating the left-eye stereoscopic space image and the right-eye stereoscopic space image using each of the rightward moved left-eye image and the leftward moved right-eye image, extracting shrunk images corresponding to the entirety shrinking command from each of the left-eye stereoscopic space image and the right-eye stereoscopic space image, and displaying the extracted images.

The displaying of the enlarged image or the shrunk image may include projecting each of a left-eye image and a right-eye image included in the stereoscopic image into a virtual stereoscopic space to generate a left-eye stereoscopic space image and a right-eye stereoscopic space image, rotating virtual cameras existing in the left-eye stereoscopic space and the right-eye stereoscopic space, extracting images corresponding to the user command from each of the left-eye stereoscopic space image and the right-eye stereoscopic space image using the rotated virtual cameras, and displaying the extracted images.

The displaying of the enlarged image or the shrunk image may include, when a portion enlarging command to enlarge a portion of the stereoscopic image is input, rotating the virtual camera existing in the left-eye stereoscopic space image rightward, rotating the virtual camera existing in the right-eye stereoscopic space image leftward, extracting images corresponding to the portion enlarging command from each of the left-eye stereoscopic space image and the right-eye stereoscopic space image using the rotated virtual cameras, and displaying the extracted images to be overlaid on the left-eye image and the right-eye image, respectively.

The displaying of the enlarged image or the shrunk image may include, when the portion shrinking command to shrink a portion of the stereoscopic image is input, rotating the virtual camera existing in the left-eye stereoscopic space image leftward, rotating the virtual camera existing in the right-eye stereoscopic space image rightward, extracting images corresponding to the portion shrinking command from each of the left-eye stereoscopic space image and the right-eye stereoscopic space image using the rotated virtual cameras, and displaying the extracted images to be overlaid on the left-eye image and the right-eye image, respectively.

Advantageous Effects

As set forth above, according to the diverse exemplary embodiments of the present disclosure, since a three-dimensional effect is adjusted at the time of enlarging or shrinking a stereoscopic image, a cross talk phenomenon may be prevented, and an enlarged image and a shrunk image having a natural three-dimensional effect may be provided to a user.

DESCRIPTION OF DRAWINGS

FIGS. 3 to 11 are views for describing a method of obtaining an enlarged image and a shrunk image according to an exemplary embodiment of the present disclosure;

BEST MODE

Hereinafter, the present disclosure will be described in more detail with reference to the accompanying drawings.

Figure 1:
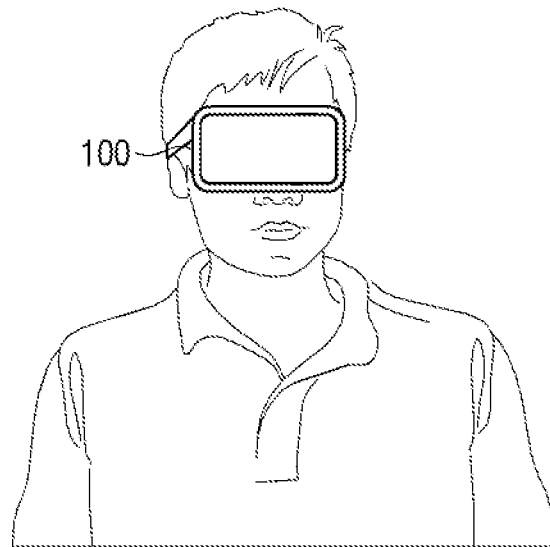
FIG. 1 is a view illustrating a display device for providing a virtual reality service according to an exemplary embodiment of the present disclosure.

FIG. 1 is a view illustrating a display device for providing a virtual reality service according to an exemplary embodiment of the present disclosure.

As illustrated in FIG. 1, a display device 100 according to an exemplary embodiment of the present disclosure may be worn on a user's head to serve as a head mounted display (HMD).

For example, the display device 100 may be implemented by a smartphone, a tablet personal computer (PC), or the like, and may be attached to a front surface of a body (for example, a housing) having a shape such as eyeglasses, a headset, or a helmet, or the like, to provide images to both eyes of the user.

That is, when the display device 100 is attached to the front surface of the body, a display included in the display device 100 is positioned adjacent to both eyes of the user. Therefore, the display device 100 may display images through the display to provide the images in front of the eyes of the user.

Meanwhile, eyeglasses temples, a band, or the like, may be formed on a rear surface of the body so that the display device may be worn on the user's head.

Alternatively, the display device 100 may be implemented by a device including its display to have a shape that may be worn on the user's head. In this case, the display is not attached or detached, but may be fixedly installed.

Meanwhile, when the user wears the display device 100 on his/her head, a region of the display that a left eye of the user views and a region of the display that a right eye of the user views may be spatially separated from each other.

Therefore, the display device 100 may display different images on the region of the display that the left eye of the user views and the region of the display that the right eye of the user views to allow the different images to be incident to the left eye and the right eye.

Meanwhile, the display device 100 may sense movement of the user's head to decide a sight line direction of the user.

To this end, the display device 100 may include at least one of a gyro sensor, an acceleration sensor, and a terrestrial magnetism sensor to sense that the user's head moves upward and downward or leftward and rightward, thereby deciding the sight line direction of the user.

In addition, the display device 100 may output images corresponding to the sight line direction of the user.

For example, the display device 100 may extract a left-eye image and a right-eye image existing in the sight line direction of the user from panorama three-dimensional (3D) images, and output the left-eye image to the region of the display that the left eye views and output the right-eye image to the region of the display that the right eye views.

Therefore, the user may receive a 3D image existing in a direction in which his/her sight line is directed among the panorama 3D images to experience virtual reality (VR).

Meanwhile, when a user command for enlarging or shrinking the displayed image is input, the display device 100 does not enlarge or shrink and display a stereoscopic image as it is, but may adjust a three-dimensional effect for the stereoscopic image and display an enlarged image or a shrunk image in which the three-dimensional effect is adjusted.

Since the three-dimensional effect is adjusted at the time of enlarging or shrinking the stereoscopic image as described above, a cross talk phenomenon may be prevented, and an enlarged image and a shrunk image having a natural three-dimensional effect may be provided.

A method of providing an enlarged image and a shrunk image in which a three-dimensional effect is adjusted will hereinafter be described in more detail with reference to the accompanying drawings.

Figure 2A:
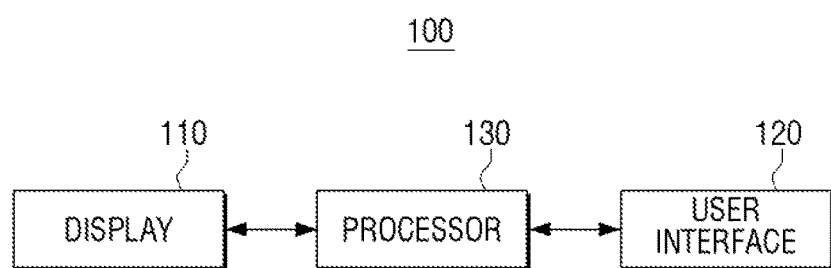
FIG. 2A is a block diagram for describing components of the display device according to an exemplary embodiment of the present disclosure.

FIG. 2A is a block diagram for describing components of the display device according to an exemplary embodiment of the present disclosure.

As illustrated in FIG. 2A, the display device 100 includes a display 110, a user interface 120, and a processor 130.

The display 110 displays a stereoscopic image. Here, the stereoscopic image may be a left-eye image and a right-eye image configuring panorama 3D images.

In detail, in the case in which the user wears the display device 100, the display 110 may display the left-eye image on the region of the display 110 that the left eye of the user views and display the right-eye image on the region of the display 110 that the right eye of the user views.

The user interface 120 receives a user command. In detail, the user interface 120 may receive a user command for enlarging or shrinking the stereoscopic image.

To this end, the user interface 120 may be implemented by buttons or touch buttons positioned on the body to receive the enlarging command or the shrinking command from the user wearing the display device 100.

The processor 130 controls a general operation of the display device 100. The processor 130 may include a central processing unit (CPU) (or a microcomputer (MICOM) and a CPU), and a random access memory (RAM) and a read only memory (ROM) for an operation of the display device 100.

First, the processor 130 may control the display 110 to display the stereoscopic image.

In detail, the processor 130 may project each of the left-eye image and the right-eye image configuring the 3D image into a virtual stereoscopic space to generate a left-eye stereoscopic space image and a right-eye stereoscopic space image.

Here, the generated stereoscopic space images may be panorama 3D images. That is, the processor 130 may project each of the left-eye image and the right-eye image into a virtual spherical space to generate the left-eye stereoscopic space image and the right-eye stereoscopic space image in which each of the left-eye image and the right-eye image exists in directions of 360° in relation to the center of the virtual spherical space.

In addition, the processor 130 may extract images existing in a direction that the user wearing the display device 100 views from the stereoscopic space images, and display the extracted images through the display 110.

In detail, the processor 130 may decide the sight line direction of the user using a sensor (not illustrated) included in the display device 100, extract images existing in regions toward which the sight line of the user is directed from each of the left-eye stereoscopic space image and the right-eye stereoscopic space image using virtual cameras positioned at the center of each of the left-eye stereoscopic space image and the right-eye stereoscopic space image, and display the extracted images.

To this end, the processor 130 may sense a direction in which the head of the user wearing the display device 100 moves using at least one of the gyro sensor, the acceleration sensor, and the terrestrial magnetism sensor included in the display device 100 to decide the direction that the user views.

In addition, the processor 130 may position virtual cameras having a predetermined field of view (FOV) at the center of each of the left-eye stereoscopic space image and the right-eye stereoscopic space image, rotate the virtual cameras in the sight line direction of the user, extract the images existing in the sight line direction of the user from each of the left-eye stereoscopic space image and the right-eye stereoscopic space image, and display the extracted images.

For example, in the case in which it is decided that the user views a direction of 60° on the left in relation to the front, the processor 130 may rotate the virtual cameras at the center of each of the left-eye stereoscopic space image and the right-eye stereoscopic space image in the direction of 60° on the left to extract images existing in the direction of 60° on the left from each of the left-eye stereoscopic space image and the right-eye stereoscopic space image.

In this case, the processor 130 may display the image extracted from the left-eye stereoscopic space image on the region of the display 110 that the left eye of the user wearing the display device 100 views and display the image extracted from the right-eye stereoscopic space image on the region of the display 110 that the right eye of the user wearing the display device 100 views.

Therefore, the user may receive a 3D image for the direction in which his/her sight line is directed among the panorama 3D images.

Meanwhile, when the user command for enlarging or shrinking the stereoscopic image is input, the processor 130 may adjust the three-dimensional effect for the stereoscopic image to correspond to the user command, and control the display 110 to display an enlarged image or a shrunk image in which the three-dimensional effect is adjusted.

Here, the enlarging command the stereoscopic image includes an entirety enlarging command for enlarging the entirety of the stereoscopic image or a portion enlarging command for enlarging a portion of the stereoscopic image, and the user command for shrinking the stereoscopic image includes an entirety shrinking command for shrinking the entirety of the stereoscopic image or a portion shrinking command for shrinking a portion of the stereoscopic image.

A method of adjusting a three-dimensional effect and providing an enlarged image and a shrunk image in the case in which the entirety enlarging command and the entirety shrinking command are input will hereinafter be first described.

The processor 130 may move each of the left-eye image and the right-eye image included in the stereoscopic image, project each of the moved left-eye image and right-eye image into the virtual stereoscopic space image to generate the left-eye stereoscopic space image and the right-eye stereoscopic space image, extract images corresponding to the user command from each of the left-eye stereoscopic space image and the right-eye stereoscopic space image, and display the extracted images.

That is, the processor 130 may move each of the left-eye image and the right-eye image to correspond to the user command before projecting the left-eye image and the right-eye image into the virtual stereoscopic space, and project each of the moved left-eye image and right-eye image into the virtual stereoscopic space to generate the left-eye stereoscopic space image and the right-eye stereoscopic space image.

In detail, when the entirety enlarging command for enlarging the entirety of the stereoscopic image is input, the processor 130 may move the left-eye image leftward, move the right-eye image rightward, generate the left-eye stereoscopic space image and the right-eye stereoscopic space image using each of the leftward moved left-eye image and the rightward moved right-eye image, extract the images corresponding to the entirety enlarging command from each of the left-eye stereoscopic space image and the right-eye stereoscopic space image, and display the extracted images.

That is, when the entirety enlarging command is input, the processor 130 may move the left-eye image and the right-eye image rightward to generate the left-eye stereoscopic space image and the right-eye stereoscopic space image, extract the enlarged images from each of the left-eye stereoscopic space image and the right-eye stereoscopic space image, and display the extracted images.

In detail, the processor 130 moves the left-eye image leftward, and generates the left-eye stereoscopic space image using the leftward moved left-eye image. In addition, the processor 130 may decrease an amount of FOV of the virtual camera existing in the left-eye stereoscopic space image by an enlarging ratio for the entirety enlarging command, and extract the enlarged image corresponding to the entirety enlarging command from the left-eye stereoscopic space image using the virtual camera of which the amount of FOV is decreased.

In this case, the processor 130 may adjust the FOV of the virtual camera, and does not change a focal position of the virtual camera. That is, the processor 130 may maintain the focal position of the virtual camera to be the same as that before the entirety enlarging command is input, and extract the enlarged image corresponding to the entirety enlarging command from the left-eye stereoscopic space image generated on the basis of the leftward moved left-eye image.

In the case of generating the left-eye stereoscopic space image by the leftward moved left-eye image as described above, the left-eye stereoscopic space image may have a state in which it is rotated counterclockwise as compared with a state in which it is moved leftward.

Therefore, an enlarged image existing further on the right may be obtained, in the case of extracting the enlarged image from the left-eye stereoscopic space image rotated counterclockwise while maintaining the focal position of the virtual camera as it is as compared with the case of extracting the enlarged image from the left-eye stereoscopic space image that is not moved leftward. That is, the enlarged image existing further on the right may be extracted, in the case of extracting the enlarged image by moving the left-eye image leftward as compared with the case of extracting the enlarged image from the left-eye image before being moved.

Meanwhile, the processor 130 may display the obtained enlarged image through the display 110.

In detail, the processor 130 may display the enlarged image obtained from the left-eye stereoscopic space image on the region of the display 110 that the left eye of the user views.

In this case, the processor 130 may adjust a size of the enlarged image to be the same as that of the image displayed on the display 110 before the entirety enlarging command is input, and display the enlarged image of which the size is adjusted.

Meanwhile, a method of obtaining an enlarged image at the time of inputting an entirety enlarging command will hereinafter be described in more detail with reference to FIG. 3.

As illustrated in FIG. 3, the processor 130 may obtain an image 320 existing in a sight line direction of a user from a left-eye image 310 using a virtual camera viewing the same direction as the sight line direction of the user, and display the image 320 on a display region 111 that a left eye of the user views.

Meanwhile, when the entirety enlarging command is input, the processor 130 may move the left-eye image leftward to generate a leftward moved image 330. In addition, the processor 130 may decrease an amount of FOV of the virtual camera by an enlarging ratio of the entirety enlarging command while maintaining a focal position of the virtual camera as it is, and obtain an enlarged image 340 from the leftward moved image using the virtual camera. In this case, the enlarged image 340 may be an image existing slightly further on the right as compared with the image 320.

In addition, the processor 130 may display the enlarged image 340 on the display region 111.

In this case, the processor 130 may adjust a size of the enlarged image 340 to be the same as that of the image 320 displayed on the display region 111, and display the enlarged image of which the size is adjusted.

Meanwhile, the processor 130 moves the right-eye image rightward, and generates the right-eye stereoscopic space image using the rightward moved right-eye image. In addition, the processor 130 may decrease an amount of FOV of the virtual camera existing in the right-eye stereoscopic space image by an enlarging ratio for the entirety enlarging command, and extract the enlarged image corresponding to the entirety enlarging command from the right-eye stereoscopic space image using the virtual camera of which the amount of FOV is decreased.

In this case, the processor 130 may adjust the FOV of the virtual camera, and does not change a focal position of the virtual camera. That is, the processor 130 may maintain the focal position of the virtual camera to be the same as that before the entirety enlarging command is input, and extract the enlarged image corresponding to the entirety enlarging command from the right-eye stereoscopic space image generated on the basis of the rightward moved right-eye image.

In the case of generating the right-eye stereoscopic space image by the rightward moved right-eye image as described above, the right-eye stereoscopic space image may have a state in which it is rotated clockwise as compared with a state in which it is moved rightward.

Therefore, an enlarged image existing further on the left may be obtained, in the case of extracting the enlarged image from the right-eye stereoscopic space image rotated clockwise while maintaining the focal position of the virtual camera as it is as compared with the case of extracting the enlarged image from the right-eye stereoscopic space image that is not moved rightward. That is, the enlarged image existing further on the left may be extracted, in the case of extracting the enlarged image by moving the right-eye image rightward as compared with the case of extracting the enlarged image from the right-eye image before being moved.

Meanwhile, the processor 130 may display the obtained enlarged image through the display 110.

In detail, the processor 130 may display the enlarged image obtained from the right-eye stereoscopic space image on the region of the display 110 that the right eye of the user views.

In this case, the processor 130 may adjust a size of the enlarged image to be the same as that of the image displayed on the display 110 before the entirety enlarging command is input, and display the enlarged image of which the size is adjusted.

Meanwhile, a method of obtaining an enlarged image at the time of inputting an entirety enlarging command will hereinafter be described in more detail with reference to FIG. 4.

As illustrated in FIG. 4, the processor 130 may obtain an image 420 existing in a sight line direction of a user from a right-eye image 410 using a virtual camera viewing the same direction as the sight line direction of the user, and display the image 420 on a display region 112 that a right eye of the user views.

Meanwhile, when the entirety enlarging command is input, the processor 130 may move the right-eye image rightward to generate a rightward moved image 430. In addition, the processor 130 may decrease an amount of FOV of the virtual camera by an enlarging ratio of the entirety enlarging command while maintaining a focal position of the virtual camera as it is, and obtain an enlarged image 440 from the rightward moved image using the virtual camera. In this case, the enlarged image 440 may be an image existing slightly further on the left as compared with the image 420.

In addition, the processor 130 may display the enlarged image 440 on the display region 112.

In this case, the processor 130 may adjust a size of the enlarged image 440 to be the same as that of the image 420 displayed on the display region 112, and display the enlarged image of which the size is adjusted.

Since the enlarged images are obtained by moving the left-eye image leftward and moving the right-eye image rightward depending on the entirety enlarging command as described above, portions in which the left-eye image and the right-eye image overlap each other at the time of enlarging the stereoscopic image are decreased, such that a cross talk phenomenon occurring due to an excessive increase in a disparity may be prevented.

Meanwhile, the enlarged images may be changed depending on the enlarging ratio for the entirety enlarging command. For example, in the case in which the enlarging ratio for the entirety enlarging command is 150%, the processor 130 may decrease FOVs of the virtual cameras by 50% to obtain the enlarged images.

In addition, the processor 130 may determine a moving level of each of the left-eye image and the right-eye image to be in proportion to the enlarging ratio for the entirety enlarging command when it moves each of the left-eye image and the right-eye image.

That is, the processor 130 may move more the left-eye image leftward and the right-eye image rightward as the enlarging ratio becomes large, and move less the left-eye image leftward and the right-eye image rightward as the enlarging ratio becomes small.

However, the processor 130 may determine the moving level of each of the left-eye image and the right-eye image in consideration of a disparity between images extracted from each of the moved left-eye image and right-eye image when it moves each of the left-eye image and the right-eye image.

For example, the processor 130 may determine the moving level of each of the left-eye image and the right-eye image so that a disparity value between the image obtained from the leftward moved left-eye image and the image obtained from the rightward moved right-eye image is larger than or equal to a disparity value between the left-eye image and the right-eye image before being moved and is generally smaller than a disparity value causing dizziness of the user.

Meanwhile, when the entirety shrinking command for shrinking the entirety of the stereoscopic image is input, the processor 130 may move the left-eye image rightward, move the right-eye image leftward, generate the left-eye stereoscopic space image and the right-eye stereoscopic space image using each of the rightward moved left-eye image and the leftward moved right-eye image, extract the shrunk images corresponding to the entirety shrinking command from each of the left-eye stereoscopic space image and the right-eye stereoscopic space image, and display the extracted images.

That is, when the entirety shrinking command is input, the processor 130 may move each of the left-eye image and the right-eye image to generate the left-eye stereoscopic space image and the right-eye stereoscopic space image, extract the shrunk images from each of the left-eye stereoscopic space image and the right-eye stereoscopic space image, and display the extracted images.

In detail, the processor 130 moves the left-eye image rightward, and generates the left-eye stereoscopic space image using the rightward moved left-eye image. In addition, the processor 130 may increase an amount of FOV of the virtual camera existing in the left-eye stereoscopic space image by a shrinking ratio for the entirety shrinking command, and extract the shrunk image corresponding to the entirety shrinking command from the left-eye stereoscopic space image using the virtual camera of which the amount of FOV is increased.

In this case, the processor 130 may adjust the FOV of the virtual camera, and does not change a focal position of the virtual camera. That is, the processor 130 may maintain the focal position of the virtual camera to be the same as that before the entirety shrinking command is input, and extract the shrunk image corresponding to the entirety shrinking command from the left-eye stereoscopic space image generated on the basis of the rightward moved left-eye image.

In the case of generating the left-eye stereoscopic space image by the rightward moved left-eye image as described above, the left-eye stereoscopic space image may have a state in which it is rotated clockwise as compared with a state in which it is moved rightward.

Therefore, an enlarged image existing further on the left may be obtained, in the case of extracting the shrunk image from the left-eye stereoscopic space image rotated clockwise while maintaining the focal position of the virtual camera as it is as compared with the case of extracting the shrunk image from the left-eye stereoscopic space image that is not moved rightward. That is, the shrunk image existing further on the left may be extracted, in the case of extracting the shrunk image by moving the left-eye image rightward as compared with the case of extracting the shrunk image from the left-eye image before being moved.

Meanwhile, the processor 130 may display the obtained shrunk image through the display 110.

In detail, the processor 130 may display the shrunk image obtained from the left-eye stereoscopic space image on the region of the display 110 that the left eye of the user views.

In this case, the processor 130 may adjust a size of the shrunk image to be the same as that of the image displayed on the display 110 before the entirety shrinking command is input, and display the shrunk image of which the size is adjusted.

Meanwhile, a method of obtaining a shrunk image at the time of inputting an entirety shrinking command will hereinafter be described in more detail with reference to FIG. 5.

As illustrated in FIG. 5, the processor 130 may obtain an image 520 existing in a sight line direction of a user from a left-eye image 510 using a virtual camera viewing the same direction as the sight line direction of the user, and display the image 520 on a display region 111 that a left eye of the user views.

Meanwhile, when the entirety shrinking command is input, the processor 130 may move the left-eye image rightward to generate a rightward moved image 530. In addition, the processor 130 may increase an amount of FOV of the virtual camera by a shrinking ratio of the entirety shrinking command while maintaining a focal position of the virtual camera as it is, and obtain a shrunk image 540 from the rightward moved image using the virtual camera. In this case, the shrunk image 540 may be an image existing slightly further on the left as compared with the image 520.

In addition, the processor 130 may display the shrunk image 540 on the display region 111.

In this case, the processor 130 may adjust a size of the shrunk image 540 to be the same as that of the image 520 displayed on the display region 111, and display the shrunk image of which the size is adjusted.

Meanwhile, the processor 130 moves the right-eye image leftward, and generates the right-eye stereoscopic space image using the leftward moved right-eye image. In addition, the processor 130 may increase an amount of FOV of the virtual camera existing in the right-eye stereoscopic space image by a shrinking ratio for the entirety shrinking command, and extract the shrunk image corresponding to the entirety shrinking command from the right-eye stereoscopic space image using the virtual camera of which the amount of FOV is increased.

In this case, the processor 130 may adjust the FOV of the virtual camera, and does not change a focal position of the virtual camera. That is, the processor 130 may maintain the focal position of the virtual camera to be the same as that before the entirety shrinking command is input, and extract the shrunk image corresponding to the entirety shrinking command from the right-eye stereoscopic space image generated on the basis of the leftward moved right-eye image.

In the case of generating the right-eye stereoscopic space image by the leftward moved right-eye image as described above, the right-eye stereoscopic space image may have a state in which it is rotated counterclockwise as compared with a state in which it is moved leftward.

Therefore, an enlarged image existing further on the right may be obtained, in the case of extracting the shrunk image from the right-eye stereoscopic space image rotated counterclockwise while maintaining the focal position of the virtual camera as it is as compared with the case of extracting the shrunk image from the right-eye stereoscopic space image that is not moved leftward. That is, the shrunk image existing further on the right may be extracted, in the case of extracting the shrunk image by moving the right-eye image leftward as compared with the case of extracting the shrunk image from the right-eye image before being moved.

Meanwhile, the processor 130 may display the obtained shrunk image through the display 110.

In detail, the processor 130 may display the shrunk image obtained from the right-eye stereoscopic space image on the region of the display 110 that the right eye of the user views.

In this case, the processor 130 may adjust a size of the shrunk image to be the same as that of the image displayed on the display 110 before the entirety shrinking command is input, and display the shrunk image of which the size is adjusted.

Meanwhile, a method of obtaining a shrunk image at the time of inputting an entirety shrinking command will hereinafter be described in more detail with reference to FIG. 6.

As illustrated in FIG. 6, the processor 130 may obtain an image 620 existing in a sight line direction of a user from a right-eye image 610 using a virtual camera viewing the same direction as the sight line direction of the user, and display the image 620 on a display region 112 that a right eye of the user views.

Meanwhile, when the entirety shrinking command is input, the processor 130 may move the right-eye image leftward to generate a leftward moved image 630. In addition, the processor 130 may increase an amount of FOV of the virtual camera by a shrinking ratio of the entirety shrinking command while maintaining a focal position of the virtual camera as it is, and obtain a shrunk image 640 from the leftward moved image using the virtual camera. In this case, the shrunk image 640 may be an image existing slightly further on the right as compared with the image 620.

In addition, the processor 130 may display the shrunk image 640 on the display region 112.

In this case, the processor 130 may adjust a size of the shrunk image 640 to be the same as that of the image 620 displayed on the display region 112, and display the shrunk image of which the size is adjusted.

Since the shrunk images are obtained by moving the left-eye image rightward and moving the right-eye image leftward depending on the entirety shrinking command as described above, a disparity between the left-eye image and the right-eye image at the time of shrinking the stereoscopic image is decreased, such that a phenomenon in which an unnatural three-dimensional effect is provided may be prevented.

Meanwhile, the shrunk images may be changed depending on the shrinking ratio for the entirety shrinking command. For example, in the case in which the shrinking ratio for the entirety shrinking command is 50%, the processor 130 may increase FOVs of the virtual cameras by 150% to obtain the shrunk images.

In addition, the processor 130 may determine a moving level of each of the left-eye image and the right-eye image to be in proportion to the shrinking ratio for the entirety shrinking command when it moves each of the left-eye image and the right-eye image.

That is, the processor 130 may move more the left-eye image rightward and the right-eye image leftward as the shrinking ratio becomes large, and move less the left-eye image rightward and the right-eye image leftward as the shrinking ratio becomes small.

However, the processor 130 may determine the moving level of each of the left-eye image and the right-eye image in consideration of a disparity between images extracted from each of the moved left-eye image and right-eye image when it moves each of the left-eye image and the right-eye image.

For example, the processor 130 may determine the moving level of each of the left-eye image and the right-eye image so that a disparity value between the image extracted from the rightward moved left-eye image and the image extracted from the leftward moved right-eye image is larger than or equal to a disparity value that may provide a generally natural three-dimensional effect and is smaller than or equal to a disparity value between the left-eye image and the right-eye image before being moved.

A method of determining moving levels of a left-eye image and a right-eye image depending on a user command will hereinafter be described in more detail with reference to FIG. 7.

However, for convenience of explanation, in FIG. 7, a method of determining moving levels of a left-eye image and a right-eye image in the case in which an entirety enlarging command is input will be described by way of example. Meanwhile, the same method as that described in FIG. 7 may be applied to the case in which an entirety shrinking command is input.

Figure 7:
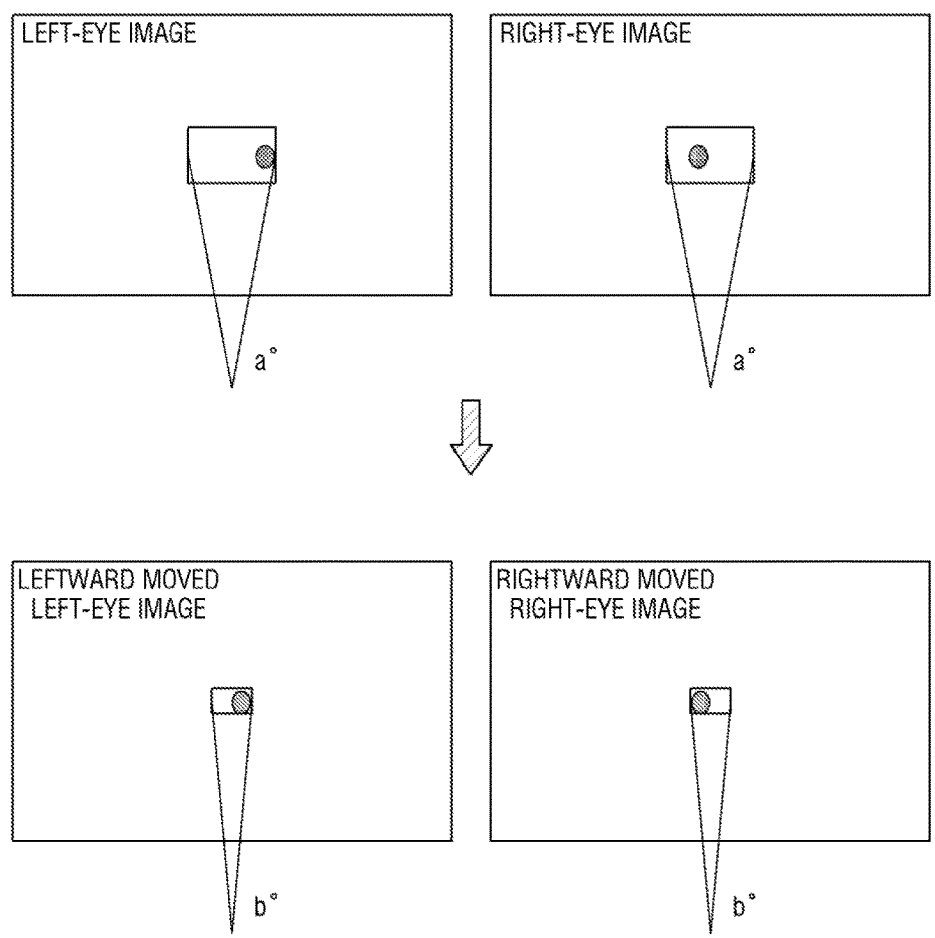

Referring to FIG. 7, an FOV of a virtual camera before the entirety shrink command is input is a °. Meanwhile, when the entirety enlarging command is input, the processor 130 may decrease the FOV of the virtual camera by an enlarging ratio of the entirety enlarging command. Therefore, an FOV of the virtual camera after the entirety enlarging command is input is b°.

Meanwhile, as described above, when the entirety enlarging command is input, the processor 130 moves the left-eye image leftward, moves the right-eye image rightward, and then obtains the enlarged images from each of the leftward moved left-eye image and the rightward moved right-eye image.

Here, the moving levels of the left-eye image and the right-eye image may be calculated on the basis of the following Equation 1.

$$\text{left shift} = \text{right shift} = (1-r)\left(\tan\frac{3}{2} - \tan\frac{b}{2}\right) \quad \text{Equation 1}$$

Here, r may be determined by an overlapped ratio, that is, a disparity value between the leftward moved left-eye image and the rightward moved right-eye image.

In this case, since the processor 130 determines the disparity value between the image extracted from the rightward moved left-eye image and the image extracted from the leftward moved right-eye image to be larger than or equal to the disparity value that may provide the generally natural three-dimensional effect and be smaller than or equal to the disparity value between the left-eye image and the right-eye image before being moved, an overlapped ratio between the leftward moved left-eye image and the rightward moved right-eye image may be determined by the determined disparity value.

Meanwhile, when the processor 130 moves the left-eye image and the right-eye image depending on the entirety enlarging command, the processor 130 may linearly move (linear movement) the left-eye image and the right-eye image or non-linearly move (non-linear movement) the left-eye image and the right-eye image. Here, the linear movement indicates that a three-dimensional effect of an entire image is adjusted, and the non-linear movement indicates that a three-dimensional effect of a central portion of an image is increased and a three-dimensional effect of the other portions is adjusted to be small.

Meanwhile, a case in which the enlarged images and the shrunk images are obtained by moving the left-eye image and the right-eye image is described in the abovementioned example. However, the enlarged images for the entirety enlarging command and the shrunk images for the entirety shrinking command may also be obtained by adjusting positions of the virtual cameras, in addition to such a method.

In detail, when the entirety enlarging command is input, the processor 130 may obtain the enlarged images for the entirety enlarging command by moving the virtual camera in the left-eye stereoscopic space rightward and moving the virtual camera in the right-eye stereoscopic space leftward without moving the left-eye image and the right-eye image.

In addition, when the entirety shrinking command is input, the processor 130 may obtain the shrunk images for the entirety shrinking command by moving the virtual camera in the left-eye stereoscopic space leftward and moving the virtual camera in the right-eye stereoscopic space rightward without moving the left-eye image and the right-eye image.

A method of adjusting a three-dimensional effect and providing an enlarged image and a shrunk image in the case in which the portion enlarging command and the portion shrinking command are input will hereinafter be described.

The processor 130 may project each of the left-eye image and the right-eye image included in the stereoscopic image into the virtual stereoscopic space to generate the left-eye stereoscopic space image and the right-eye stereoscopic space image, rotate the virtual cameras existing in the left-eye stereoscopic space image and the right-eye stereoscopic space, extract the images corresponding to the user command from each of the left-eye stereoscopic space image and the right-eye stereoscopic space image using the rotated virtual cameras, and display the extracted images.

In detail, the processor 130 may rotate the virtual camera existing in the left-eye stereoscopic space rightward, rotate the virtual camera existing in the right-eye stereoscopic space leftward, extract images corresponding to a portion enlarging command for enlarging a portion of the stereoscopic image from each of the left-eye stereoscopic space image and the right-eye stereoscopic space image using the rotated virtual cameras, and display the extracted images to be overlaid on the left-eye image and the right-eye image, respectively, when the portion enlarging command is input.

That is, the processor 130 may rotate the virtual cameras existing in the left-eye stereoscopic space and the right-eye stereoscopic space, extract the enlarged images from each of the left-eye stereoscopic space image and the right-eye stereoscopic space image using the rotated virtual cameras, and display the extracted images, when the portion enlarging command is input.

In detail, the processor 130 adjusts an amount of FOV of the virtual camera to be a magnitude at which an image corresponding to a size of a region for which the portion enlarging command is input may be obtained, when the portion enlarging command is input. That is, since the portion enlarging command is a command for enlarging a partial region of the image that is currently being displayed, the processor 130 may decide a region for which the portion enlarging command is input in the image that is currently being displayed, and adjust the amount of FOV of the virtual camera to be a magnitude at which an image corresponding to a size of the decided region may be obtained.

Then, the processor 130 rotates the virtual camera positioned at the center of the left-eye stereoscopic space rightward, and additionally decreases the amount of FOV of the virtual camera by an enlarging ratio for the portion enlarging command. In addition, the processor 130 may extract an enlarged image corresponding to the portion enlarging command from the left-eye stereoscopic space image using the rightward rotated virtual camera.

In this case, the processor 130 rotates the virtual camera and adjusts the amount of FOV of the virtual camera, without moving the left-eye image. That is, the processor 130 may maintain the left-eye stereoscopic space image to be the same as the left-eye stereoscopic space image before the portion enlarging command is input, and extract an enlarged image corresponding to the portion enlarging command from the left-eye stereoscopic space image on the basis of the rightward rotated virtual camera.

Therefore, an enlarged image existing further on the right may be obtained, in the case of extracting the enlarged image from the left-eye stereoscopic space image using the rightward rotated virtual camera while maintaining the left-eye stereoscopic space image as it is as compared with the case of extracting the enlarged image using a camera that is not rotated.

Meanwhile, the processor 130 may display the obtained enlarged image through the display 110.

In detail, the processor 130 may display the enlarged image obtained from the left-eye stereoscopic space image on the region of the display 110 that the left eye of the user views.

In this case, the processor 130 may adjust a size of the enlarged image and display the enlarged image of which the size is adjusted so that the enlarged image is overlaid on the region for which the portion enlarging command is input in the image displayed on the display 110 before the portion enlarging command is input.

Meanwhile, a method of obtaining an enlarged image at the time of inputting a portion enlarging command will hereinafter be described in more detail with reference to FIG. 8.

Figure 8:
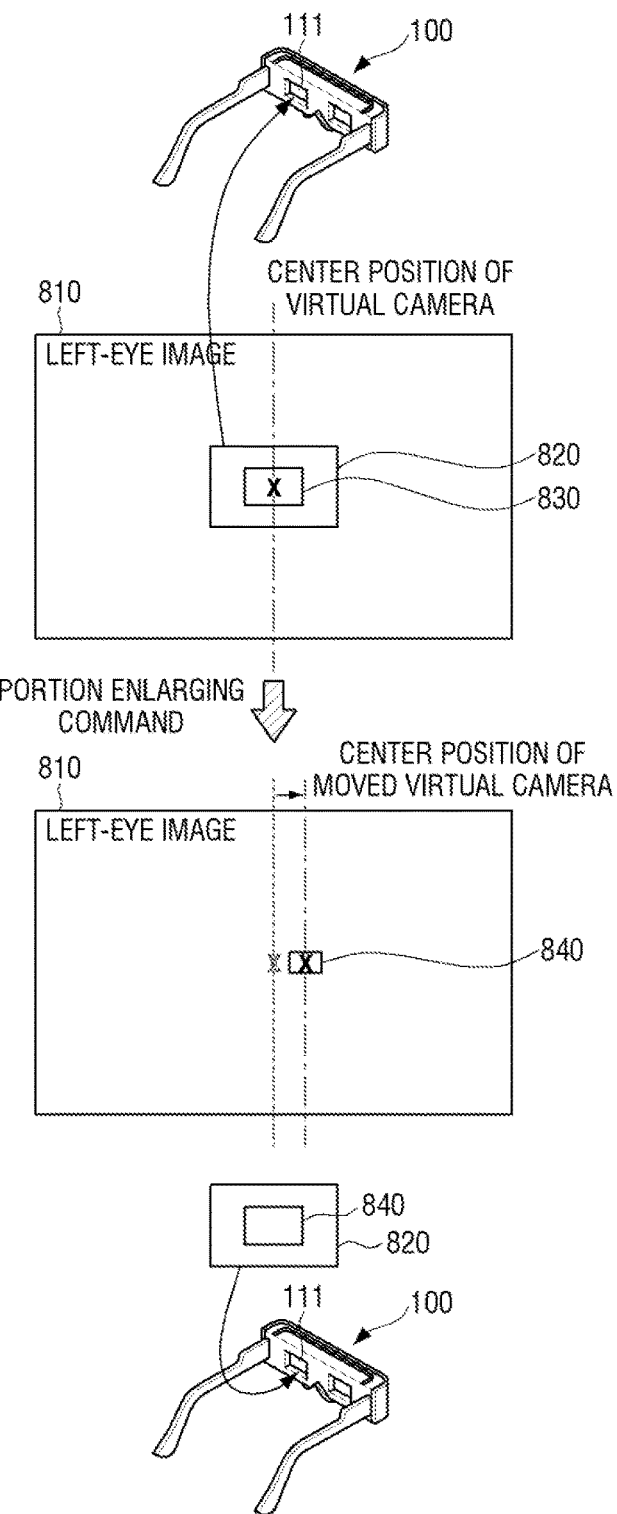

As illustrated in FIG. 8, the processor 130 may obtain an image 820 existing in a sight line direction of a user from a left-eye image 810 using a virtual camera viewing the same direction as the sight line direction of the user, and display the image 820 on a display region 111 that a left eye of the user views.

Meanwhile, a portion enlarging command for a partial region of the image 820 that is currently being displayed may be input. In this case, the processor 130 may decrease an amount of FOV of the virtual camera to be an FOV at which an image 830 for the region for which the portion enlarging command is input may be obtained.

In addition, the processor 130 may rotate the virtual camera rightward and decrease the amount of FOV of the virtual camera by an enlarging ratio of the portion enlarging command while maintaining the left-eye image as it is, and obtain an enlarged image 840 using the virtual camera. In this case, the enlarged image 840 may be an image existing slightly further on the right as compared with the image 820.

In addition, the processor 130 may display the enlarged image 840 on the display region 111.

In this case, the processor 130 may adjust a size of the enlarged image 840, and display the enlarged image of which the size is adjusted to be overlaid on the region for which the portion enlarging command is input in the image 820 displayed on the display region 111.

Meanwhile, as described above, the processor 130 adjusts the amount of FOV of the virtual camera to be the magnitude at which the image corresponding to the size of the region for which the portion enlarging command is input may be obtained, when the portion enlarging command is input.

Then, the processor 130 rotates the virtual camera positioned at the center of the right-eye stereoscopic space leftward, and additionally decreases the amount of FOV of the virtual camera by an enlarging ratio for the portion enlarging command. In addition, the processor 130 may extract an enlarged image corresponding to the portion enlarging command from the right-eye stereoscopic space image using the leftward rotated virtual camera.

In this case, the processor 130 rotates the virtual camera and adjusts the amount of FOV of the virtual camera, without moving the right-eye image. That is, the processor 130 may maintain the right-eye stereoscopic space image to be the same as the right-eye stereoscopic space image before the portion enlarging command is input, and extract an enlarged image corresponding to the portion enlarging command from the right-eye stereoscopic space image on the basis of the leftward rotated virtual camera.

Therefore, an enlarged image existing further on the left may be obtained, in the case of extracting the enlarged image from the right-eye stereoscopic space image using the leftward rotated virtual camera while maintaining the right-eye stereoscopic space image as it is as compared with the case of extracting the enlarged image using a camera that is not rotated.

Meanwhile, the processor 130 may display the obtained enlarged image through the display 110.

In detail, the processor 130 may display the enlarged image obtained from the right-eye stereoscopic space image on the region of the display 110 that the right eye of the user views.

In this case, the processor 130 may adjust a size of the enlarged image and display the enlarged image of which the size is adjusted so that the enlarged image is overlaid on the region for which the portion enlarging command is input in the image displayed on the display 110 before the portion enlarging command is input.

Meanwhile, a method of obtaining an enlarged image at the time of inputting a portion enlarging command will hereinafter be described in more detail with reference to FIG. 9.

Figure 9:
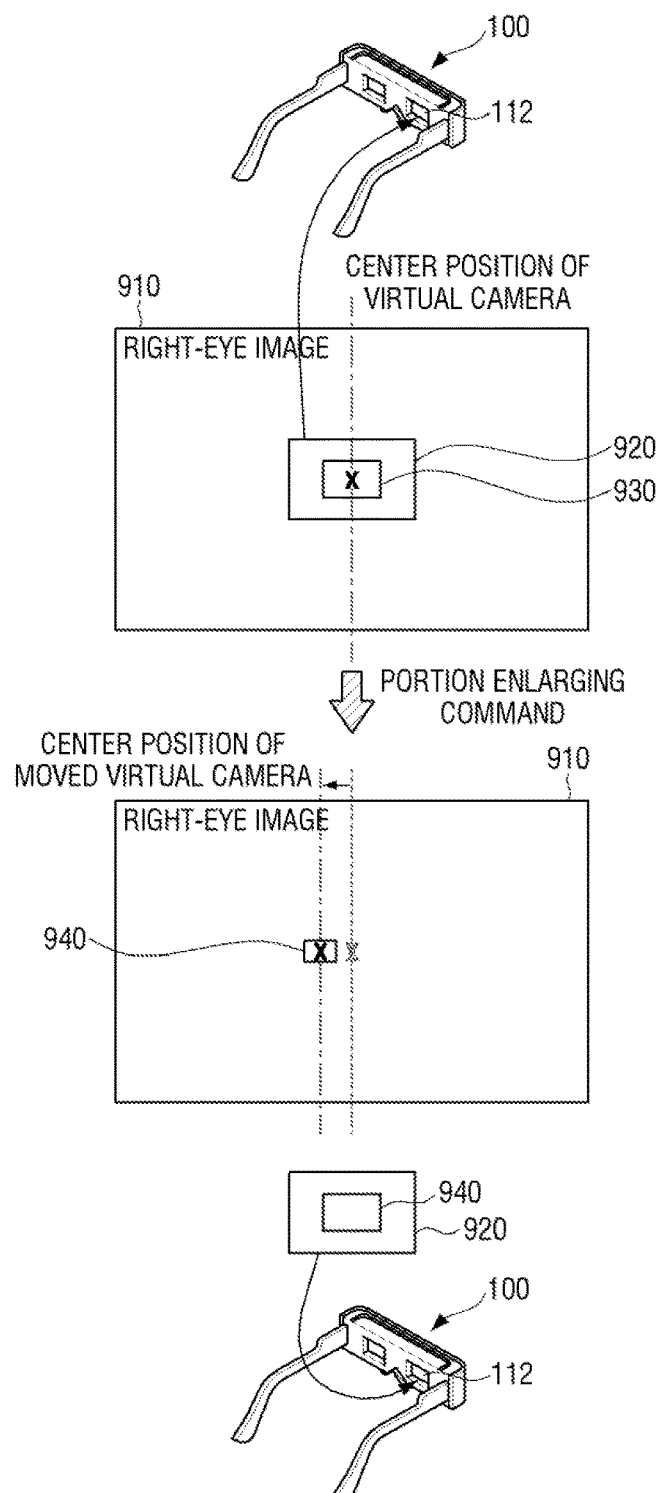

As illustrated in FIG. 9, the processor 130 may obtain an image 920 existing in a sight line direction of a user from a right-eye image 910 using a virtual camera viewing the same direction as the sight line direction of the user, and display the image 920 on a display region 112 that a right eye of the user views.

Meanwhile, a portion enlarging command for a partial region of the image 920 that is currently being displayed may be input. In this case, the processor 130 may decrease an amount of FOV of the virtual camera to be an FOV at which an image 930 for the region for which the portion enlarging command is input may be obtained.

In addition, the processor 130 may rotate the virtual camera leftward and decrease the amount of FOV of the virtual camera by an enlarging ratio of the portion enlarging command while maintaining the right-eye image as it is, and obtain an enlarged image 940 using the virtual camera. In this case, the enlarged image 940 may be an image existing slightly further on the left as compared with the image 920.

In addition, the processor 130 may display the enlarged image 940 on the display region 112.

In this case, the processor 130 may adjust a size of the enlarged image 940, and display the enlarged image of which the size is adjusted to be overlaid on the region for which the portion enlarging command is input in the image 920 displayed on the display region 112.

Since the enlarged images are obtained by rotating the virtual camera in the left-eye stereoscopic space rightward and rotating the virtual camera in the right-eye stereoscopic space leftward depending on the portion enlarging command as described above, portions in which the left-eye image and the right-eye image overlap each other at the time of enlarging the stereoscopic image are decreased, such that a cross talk phenomenon occurring due to an excessive increase in a disparity may be prevented.

Meanwhile, the enlarged images may be changed depending on an enlarging ratio for the portion enlarging command. For example, in the case in which the enlarging ratio for the portion enlarging command is 150%, the processor 130 may decrease FOVs of the virtual cameras by 50% to obtain the enlarged images.

In addition, the processor 130 may determine rotating levels of the virtual cameras to be in proportion to the enlarging ratio for the portion enlarging command when it rotates the virtual cameras.

That is, the processor 130 may rotate more the virtual cameras in the left-eye stereoscopic space and the right-eye stereoscopic space as the enlarging ratio becomes large, and rotate less the virtual cameras in the left-eye stereoscopic space and the right-eye stereoscopic space as the enlarging ratio becomes small.

However, the processor 130 may determine the rotating levels of the virtual cameras in consideration of a disparity between images obtained by the rotated virtual cameras when it rotates the virtual cameras.

For example, the processor 130 may determine the rotating levels of the virtual cameras so that a disparity value between an image obtained by the rightward rotated virtual camera in the left-eye stereoscopic space and an image obtained by the leftward rotated virtual camera in the right-eye stereoscopic space is larger than or equal to a disparity value between the left-eye image and the right-eye image before the rotated and is smaller than a disparity value generally causing dizziness of the user.

Meanwhile, the processor 130 may rotate the virtual camera existing in the left-eye stereoscopic space leftward, rotate the virtual camera existing in the right-eye stereoscopic space rightward, extract images corresponding to a portion shrinking command for shrinking a portion of the stereoscopic image from each of the left-eye stereoscopic space image and the right-eye stereoscopic space image using the rotated virtual cameras, and display the extracted images to be overlaid on the left-eye image and the right-eye image, respectively, when the portion shrinking command is input.

That is, the processor 130 may rotate the virtual cameras existing in the left-eye stereoscopic space and the right-eye stereoscopic space, extract the shrunk images from each of the left-eye stereoscopic space image and the right-eye stereoscopic space image using the rotated virtual cameras, and display the extracted images, when the portion shrinking command is input.

In detail, the processor 130 adjusts an amount of FOV of the virtual camera to be a magnitude at which an image corresponding to a size of a region for which the portion shrinking command is input may be obtained, when the portion shrinking command is input. That is, since the portion shrinking command is a command for shrinking a partial region of the image that is currently being displayed, the processor 130 may decide a region for which the portion shrinking command is input in the image that is currently being displayed, and adjust the amount of FOV of the virtual camera to be a magnitude at which an image corresponding to a size of the decided region may be obtained.

Then, the processor 130 rotates the virtual camera positioned at the center of the left-eye stereoscopic space leftward, and additionally increases the amount of FOV of the virtual camera by a shrinking ratio for the portion shrinking command. In addition, the processor 130 may extract a shrunk image corresponding to the portion enlarging command from the left-eye stereoscopic space image using the leftward rotated virtual camera.

In this case, the processor 130 rotates the virtual camera and adjusts the amount of FOV of the virtual camera, without moving the left-eye image. That is, the processor 130 may maintain the left-eye stereoscopic space image to be the same as the left-eye stereoscopic space image before the portion shrinking command is input, and extract a shrunk image corresponding to the portion enlarging command from the left-eye stereoscopic space image on the basis of the leftward rotated virtual camera.

Therefore, a shrunk image existing further on the left may be obtained, in the case of extracting the shrunk image from the left-eye stereoscopic space image using the leftward rotated virtual camera while maintaining the left-eye stereoscopic space image as it is as compared with the case of extracting the shrunk image using a camera that is not rotated.

Meanwhile, the processor 130 may display the obtained shrunk image through the display 110.

In detail, the processor 130 may display the shrunk image obtained from the left-eye stereoscopic space image on the region of the display 110 that the left eye of the user views.

In this case, the processor 130 may adjust a size of the shrunk image and display the shrunk image of which the size is adjusted so that the shrunk image is overlaid on the region for which the portion shrinking command is input in the image displayed on the display 110 before the portion enlarging command is input.

Meanwhile, a method of obtaining a shrunk image at the time of inputting a portion shrinking command will hereinafter be described in more detail with reference to FIG. 10.

Figure 10:
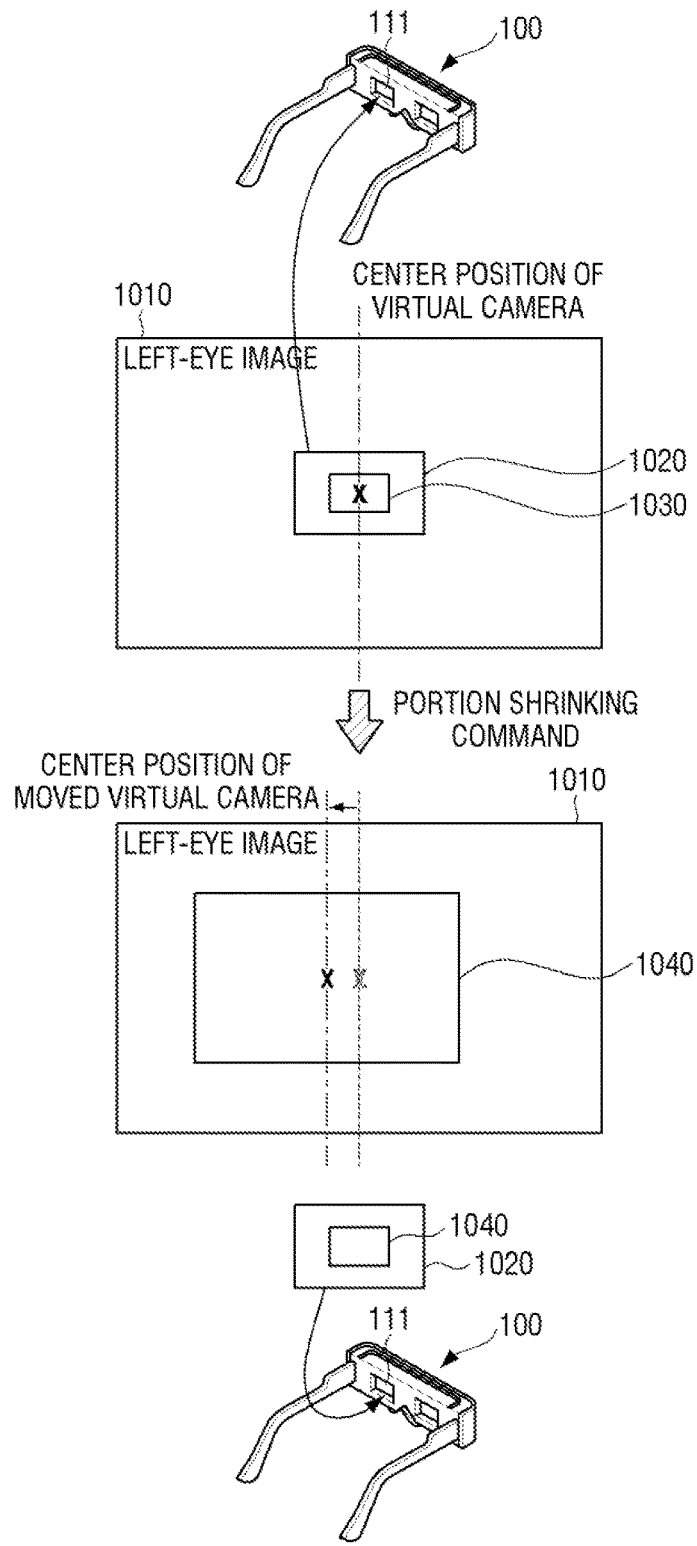

As illustrated in FIG. 10, the processor 130 may obtain an image 1020 existing in a sight line direction of a user from a left-eye image 1010 using a virtual camera viewing the same direction as the sight line direction of the user, and display the image 1020 on a display region 111 that a left eye of the user views.

Meanwhile, a portion shrinking command for a partial region of the image 1020 that is currently being displayed may be input. In this case, the processor 130 may decrease an amount of FOV of the virtual camera to be an FOV at which an image 1030 for the region for which the portion shrinking command is input may be obtained.

In addition, the processor 130 may rotate the virtual camera leftward and increase the amount of FOV of the virtual camera by a shrinking ratio of the portion shrinking command while maintaining the left-eye image as it is, and obtain a shrunk image 1040 using the virtual camera. In this case, the shrunk image 1040 may be an image existing slightly further on the left as compared with the image 1020.

In addition, the processor 130 may display the shrunk image 1040 on the display region 111.

In this case, the processor 130 may adjust a size of the shrunk image 1040, and display the shrunk image of which the size is adjusted to be overlaid on the region for which the portion shrinking command is input in the image 1020 displayed on the display region 111.

Meanwhile, as described above, the processor 130 adjusts the amount of FOV of the virtual camera to be the magnitude at which the image corresponding to the size of the region for which the portion enlarging command is input may be obtained, when the portion shrinking command is input.

Then, the processor 130 rotates the virtual camera positioned at the center of the right-eye stereoscopic space rightward, and additionally increases the amount of FOV of the virtual camera by a shrinking ratio for the portion shrinking command. In addition, the processor 130 may extract a shrunk image corresponding to the portion shrinking command from the right-eye stereoscopic space image using the rightward rotated virtual camera.

In this case, the processor 130 rotates the virtual camera and adjusts the amount of FOV of the virtual camera, without moving the right-eye image. That is, the processor 130 may maintain the right-eye stereoscopic space image to be the same as the right-eye stereoscopic space image before the portion shrinking command is input, and extract a shrunk image corresponding to the portion shrinking command from the right-eye stereoscopic space image on the basis of the rightward rotated virtual camera.

Therefore, a shrunk image existing further on the right may be obtained, in the case of extracting the shrunk image from the right-eye stereoscopic space image using the rightward rotated virtual camera while maintaining the right-eye stereoscopic space image as it is as compared with the case of extracting the shrunk image using a camera that is not rotated.

Meanwhile, the processor 130 may display the obtained shrunk image through the display 110.

In detail, the processor 130 may display the shrunk image obtained from the right-eye stereoscopic space image on the region of the display 110 that the right eye of the user views.

In this case, the processor 130 may adjust a size of the shrunk image and display the shrunk image of which the size is adjusted so that the shrunk image is overlaid on the region for which the portion shrinking command is input in the image displayed on the display 110 before the portion shrinking command is input.

Meanwhile, a method of obtaining a shrunk image at the time of inputting a portion shrinking command will hereinafter be described in more detail with reference to FIG. 11.

Figure 11:
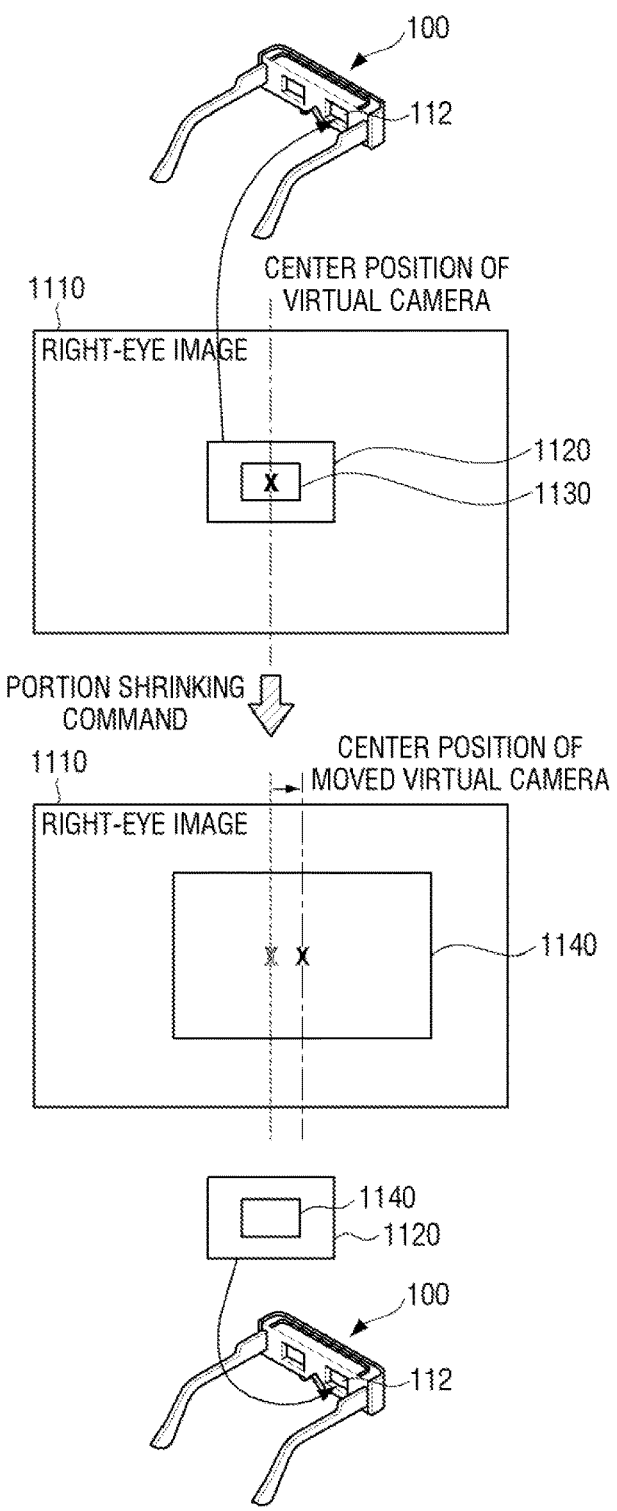

As illustrated in FIG. 11, the processor 130 may obtain an image 1120 existing in a sight line direction of a user from a right-eye image 1110 using a virtual camera viewing the same direction as the sight line direction of the user, and display the image 1120 on a display region 112 that a right eye of the user views.

Meanwhile, a portion shrinking command for a partial region of the image 1120 that is currently being displayed may be input. In this case, the processor 130 may decrease an amount of FOV of the virtual camera to be an FOV at which an image 1130 for the region for which the portion shrinking command is input may be obtained.

In addition, the processor 130 may rotate the virtual camera rightward and increase the amount of FOV of the virtual camera by a shrinking ratio of the portion shrinking command while maintaining the right-eye image as it is, and obtain a shrunk image 1140 using the virtual camera. In this case, the shrunk image 1140 may be an image existing slightly further on the right as compared with the image 1120.

In addition, the processor 130 may display the shrunk image 1140 on the display region 112.

In this case, the processor 130 may adjust a size of the shrunk image 1140, and display the shrunk image of which the size is adjusted to be overlaid on the region for which the portion shrinking command is input in the image 1120 displayed on the display region 112.

Since the shrunk images are obtained by moving the virtual camera in the left-eye stereoscopic space leftward and moving the virtual camera in the right-eye stereoscopic space rightward depending on the portion shrinking command as described above, a disparity between the left-eye image and the right-eye image at the time of shrinking the stereoscopic image is decreased, such that a phenomenon in which an unnatural three-dimensional effect is provided may be prevented.

Meanwhile, the shrunk images may be changed depending on the shrinking ratio for the portion shrinking command. For example, in the case in which the shrinking ratio for the portion shrinking command is 50%, the processor 130 may increase FOVs of the virtual cameras by 150% to obtain the shrunk images.

In addition, the processor 130 may determine rotating levels of the virtual cameras to be in proportion to the shrinking ratio for the portion shrinking command when it rotates the virtual cameras.

That is, the processor 130 may rotate more the virtual cameras in the left-eye stereoscopic space and the right-eye stereoscopic space as the shrinking ratio becomes large, and rotate less the virtual cameras in the left-eye stereoscopic space and the right-eye stereoscopic space as the shrinking ratio becomes small.

However, the processor 130 may determine the rotating levels of the virtual cameras in consideration of a disparity between images obtained by the rotated virtual cameras when it rotates the virtual cameras.

For example, the processor 130 may determine the rotating levels of the virtual cameras so that a disparity value between an image obtained by the rightward rotated virtual camera in the left-eye stereoscopic space and an imaged obtained the leftward rotated virtual camera in the right-eye stereoscopic space is larger than or equal to a disparity value that may provide a generally natural three-dimensional effect and is smaller than or equal to a disparity value between the left-eye image and the right-eye image before the rotated.

Meanwhile, the images obtained by the rotated virtual cameras at the time of enlarging and shrinking a portion of the image may be called telephoto images. That is, since only a portion of the image that is previously displayed is enlarged or shrunk and displayed when the portion enlarging command and the portion shrinking command are input, a telephoto effect (or a map effect) may be provided to the user.

Meanwhile, at the time of enlarging and shrinking a portion of the image, an angle at which the virtual camera is rotated may be determined on the basis of the above Equation 1.

In detail, in the case in which a central axis of the region for which the portion enlarging command and the portion shrinking command are input coincides with an axis on which a focus of the virtual camera is positioned, the processor 130 may rotate the virtual camera in a ratio corresponding to the moving level calculated in the above Equation 1.

However, in the case in which the central axis of the region for which the portion enlarging command and the portion shrinking command are input does not coincide with the axis on which the focus of the virtual camera is positioned, the processor 130 may calculate a moving distance between the central axis of the region for which the portion enlarging command and the portion shrinking command are input and the axis on which the focus of the virtual camera is positioned, and rotate the virtual camera in a ratio corresponding to a value obtained by adding the calculated moving distance to the moving level calculated in the above Equation 1.

Figure 2B:
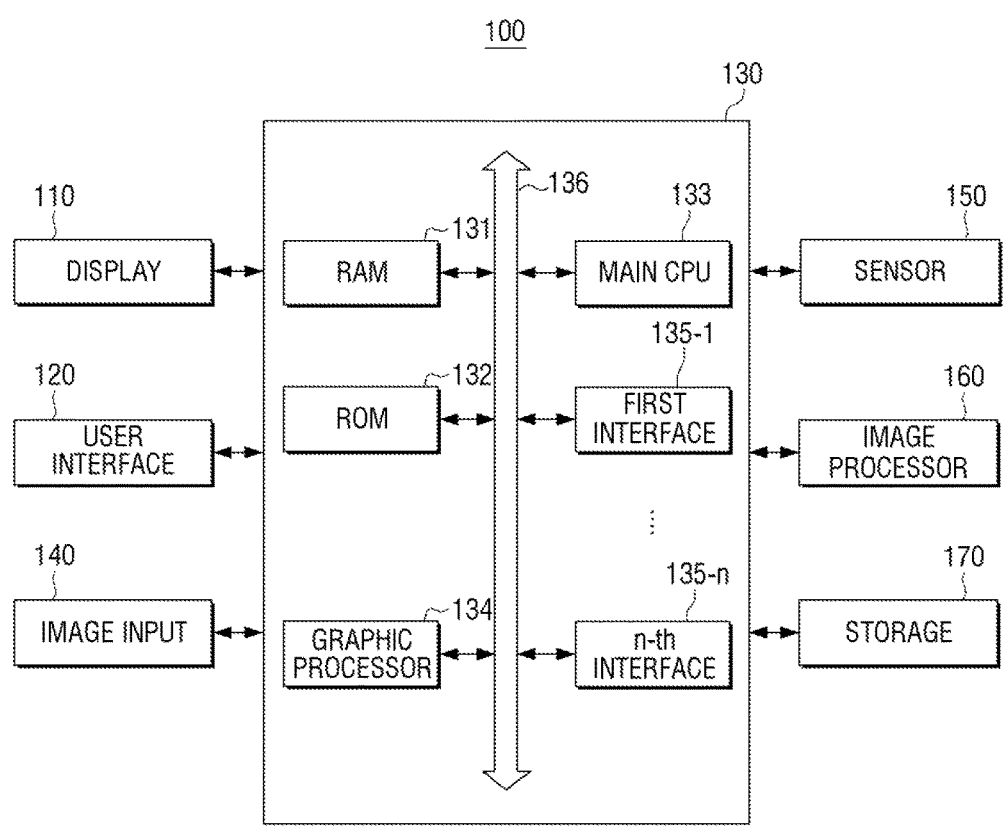
FIG. 2B is a block diagram for describing detailed components of the display device according to an exemplary embodiment of the present disclosure.

FIG. 2B is a block diagram for describing detailed components of the display device according to an exemplary embodiment of the present disclosure.

As illustrated in FIG. 2B, the display device 100 may further include an image input 140, a sensor 150, an image processor 160, and a storage 170, in addition to the display 110, the user interface 120, and the processor 130, and operations of the image input 140, the sensor 150, the image processor 160, and the storage 170 may be controlled by the processor 130. Meanwhile, since the display 110, the user interface 120, and the processor 130 are described above with reference to FIG. 2A, a detailed description therefor will be omitted.

The image input 140 receives a stereoscopic image. For example, the image input 140 may be connected to a server (not illustrated) or another device (not illustrated) to receive the stereoscopic image.

The sensor 150 senses a state of the display device 100. In detail, the sensor 150 may include at least one a terrestrial magnetism sensor, a gyro sensor, and an acceleration sensor, and the processor 130 may decide a motion state of the display device 100 such as an attitude, a rotation direction, a rotation level, and the like, of the display device 100 on the basis of a sensed result of the sensor 150.

Therefore, the processor 130 may decide a direction that the user views by sensing a moving direction of the head of the user wearing the display device 100 depending on the motion state of the display device 100.

The image processor 160 may render an image corresponding to the motion state of the display device 100 and an image corresponding to the user command, and provide the rendered images to the display 110.

In detail, the processor 130 may control the image processor 160 to project a left-eye image and a right-eye image into a virtual stereoscopic space to a left-eye stereoscopic space image and a right-eye stereoscopic space image and render an image existing the direction that the user wearing the display device 100 views among the stereoscopic space images.

In addition, the processor 130 may control the image processor 160 to render an enlarged image depending on an enlarging command and a shrunk image depending on a shrinking command.

The storage 170 stores various data such as an operating system (O/S) software module for driving the display device 100, various programs, contents, and the like.

In addition, the storage 170 may store the stereoscopic image input through the image input 140.

Meanwhile, the operation of the processor 130 described above may be performed by a program stored in the storage 170.

In detail, the processor 130 includes a random access memory (RAM) 131, a read only memory (ROM) 132, a main central processing unit (CPU) 133, a graphic processor 134, first to n-th interfaces 135-1 to 135-n, and a bus 136.

The RAM 131, the ROM 132, the main CPU 133, the graphic processor 134, the first to n-th interfaces 135-1 to 135-n, and the like, may be connected to one another through the bus 136.

The first to n-th interfaces 135-1 to 135-n are connected to the various components described above. One of the interfaces may be a network interface connected to an external device through a network.

The main CPU 133 accesses the storage 170 to perform booting using the O/S stored in the storage 170. In addition, the main CPU 133 performs various operations using various programs, contents, data, and the like, stored in the storage 170.

An instruction set for booting a system, or the like, is stored in the ROM 132. When a turn-on command is input to supply power to the main CPU 133, the main CPU 133 copies the operating system (O/S) stored in the storage 140 to the RAM 131 depending on an instruction stored in the ROM 132, and execute the O/S to boot the system. When the booting is completed, the main CPU 133 copies various application programs stored in the storage 170 to the RAM 131, and executes the application programs copied to the RAM 131 to perform various operations.

The graphic processor 134 renders a screen including various objects such as an icon, an image, a text, and the like, using a calculator (not illustrated) and a renderer (not illustrated). The calculator (not illustrated) calculates attribute values such as coordinate values at which the respective objects will be displayed, forms, sizes, colors, and the like, of the respective objects depending on a layout of a screen on the basis of a received control command. The renderer (not illustrated) renders screens of various layouts including objects on the basis of the attribute values calculated in the calculator (not illustrated).

Figure 12:
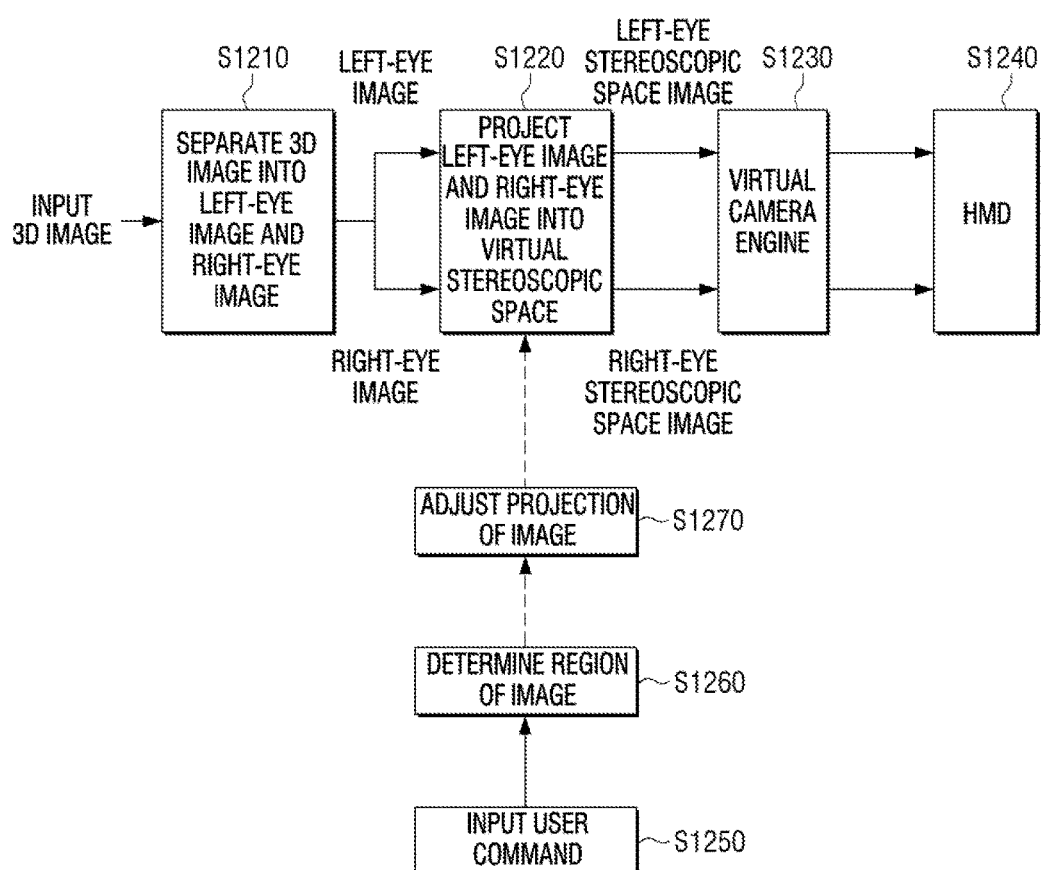
FIG. 12 is a view for describing a method of generating and outputting an image depending on an enlarging command and a shrinking command according to an exemplary embodiment of the present disclosure.

FIG. 12 is a view for describing a method of generating and outputting an image depending on an enlarging command and a shrinking command according to an exemplary embodiment of the present disclosure.

As illustrated in FIG. 12, the display device 100 separates a 3D image into the left-eye image and the right-eye image (S1210), and projects each of the left-eye image and the right-eye image into the virtual stereoscopic space to generate the left-eye stereoscopic space image and the right-eye stereoscopic space image (S1220). In this case, the generated left-eye stereoscopic space image and the right-eye stereoscopic space image, which are the panorama 3D images, may have a spherical shape in the virtual stereoscopic space.

Then, the display device may obtain and output an image existing in the direction that the user views through a virtual camera engine (S1230 and S1240) to provide a 3D VR image to the user.

Meanwhile, when the user command for enlarging or shrinking the stereoscopic image is input (S1250), the display device may move the image or rotate the virtual camera to determine the region of the image corresponding to the enlarging command or the shrinking command and adjust the FOV of the virtual camera to adjust projection for the determined region, thereby generating the enlarged image and a shrunk image (S1260 and S1270).

Then, the display device may output the enlarged image and the shrunk image to provide an enlarged image and a shrunk image in which a three-dimensional effect is adjusted depending on the enlarging command and the shrinking command in the 3D VR image to the user.

Figure 13:
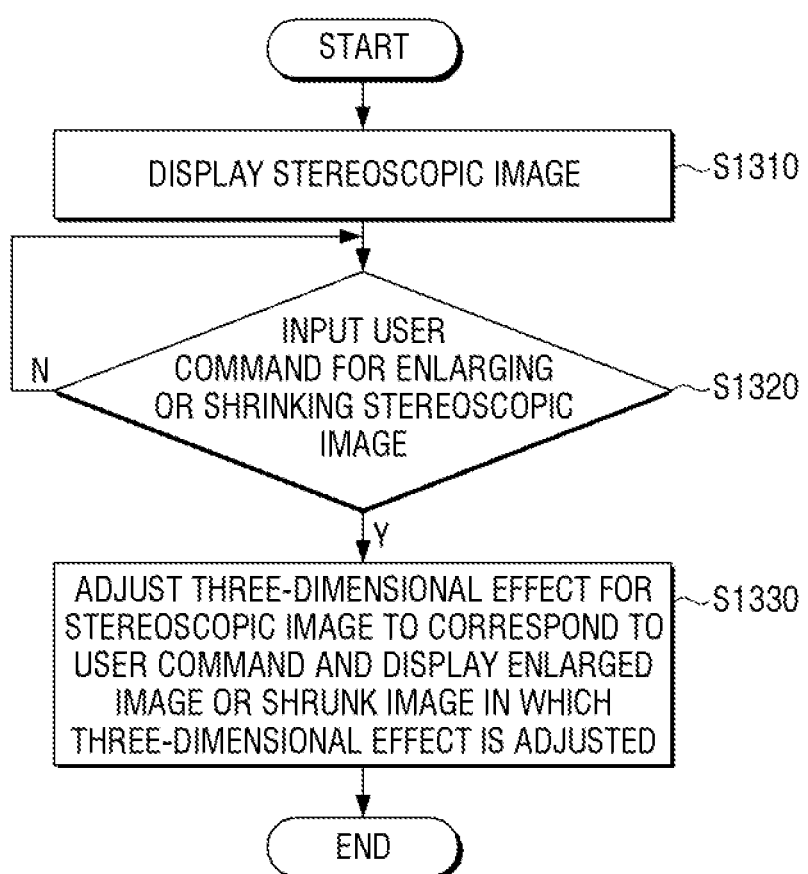
FIG. 13 is a flow chart for describing a control method according to an exemplary embodiment of the present disclosure.

FIG. 13 is a flow chart for describing a control method of a display device for providing a virtual reality service according to an exemplary embodiment of the present disclosure.

First, the stereoscopic image is displayed (S1310).

Then, when the user command for enlarging or shrinking the stereoscopic image (S1320-Y), the three-dimensional effect for the stereoscopic image is adjusted to correspond to the user command, and the enlarged image or the shrunk image in which the three-dimensional effect is adjusted is displayed (S1330).

In detail, in S1330, each of the left-eye image and the right-eye image included in the stereoscopic image may be moved, each of the moved left-eye image and right-eye image may be projected into the virtual stereoscopic space to generate the left-eye stereoscopic space image and the right-eye stereoscopic space image, the images corresponding to the user command may be extracted from each of the left-eye stereoscopic space image and the right-eye stereoscopic space image, and the extracted images may be displayed.

In detail, when the entirety enlarging command for enlarging the entirety of the stereoscopic image is input, the left-eye image may be moved leftward, the right-eye image may be moved rightward, the left-eye stereoscopic space image and the right-eye stereoscopic space image may be generated using each of the leftward moved left-eye image and the rightward moved right-eye image, the enlarged images corresponding to the entirety enlarging command may be extracted from each of the left-eye stereoscopic space image and the right-eye stereoscopic space image, and the extracted images may be displayed.

Alternatively, when the entirety enlarging command for enlarging the entirety of the stereoscopic image is input, the left-eye image may be moved rightward, the right-eye image may be moved leftward, the left-eye stereoscopic space image and the right-eye stereoscopic space image may be generated using each of the rightward moved left-eye image and the leftward moved right-eye image, the shrunk images corresponding to the entirety shrinking command may be extracted from each of the left-eye stereoscopic space image and the right-eye stereoscopic space image, and the extracted images may be displayed.

Meanwhile, in S1330, each of the left-eye image and the right-eye image included in the stereoscopic image may be projected into the virtual stereoscopic space to generate the left-eye stereoscopic space image and the right-eye stereoscopic space image, the virtual cameras existing in the left-eye stereoscopic space and the right-eye stereoscopic space may be rotated, the images corresponding to the user command may be extracted from each of the left-eye stereoscopic space image and the right-eye stereoscopic space image using the rotated virtual cameras, and the extracted images may be displayed.

In detail, when the portion enlarging command for enlarging a portion of the stereoscopic image is input, the virtual camera existing in the left-eye stereoscopic space may be rotated rightward, the virtual camera existing in the right-eye stereoscopic space may be rotated leftward, the images corresponding to the portion enlarging command may be extracted from each of the left-eye stereoscopic space image and the right-eye stereoscopic space image using the rotated virtual cameras, and the extracted images may be displayed to be overlaid on the left-eye image and the right-eye image, respectively.

Alternatively, when the portion shrinking command for shrinking a portion of the stereoscopic image is input, the virtual camera existing in the left-eye stereoscopic space may be rotated leftward, the virtual camera existing in the right-eye stereoscopic space may be rotated rightward, the images corresponding to the portion shrinking command may be extracted from each of the left-eye stereoscopic space image and the right-eye stereoscopic space image using the rotated virtual cameras, and the extracted images may be disposed to be overlaid on the left-eye image and the right-eye image, respectively.

Meanwhile, a method of generating the enlarged image depending on the enlarging command and generating the shrunk image depending on the shrinking command is described above.

Meanwhile, the methods according to the diverse exemplary embodiments described above may be programmed and stored in various storage media. Therefore, the methods according to the diverse exemplary embodiments described above may be implemented in various types of electronic devices executing the storage media.

In detail, according to the exemplary embodiment of the present disclosure, a non-transitory computer readable medium in which a program sequentially performing a process of displaying the stereoscopic image and a process of adjusting a three-dimensional effect for the stereoscopic image to correspond to the user command for enlarging or shrinking the stereoscopic image and displaying the enlarged image or the shrunk image in which the three-dimensional effect is adjusted when the user command is input is stored may be provided.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present disclosure have been illustrated and described hereinabove, the present disclosure is not limited to the specific exemplary embodiments described above, but may be variously modified by those skilled in the art to which the present disclosure pertains without departing from the scope and spirit of the disclosure as claimed in the claims. These modifications should also be understood to fall within the scope of the present disclosure.

The invention claimed is:

1. A display device for providing a virtual reality service, the display device comprising:
 a display;
 a user interface; and
 a processor configured to:
  based on a user command being input through the user interface, adjust a three-dimensional effect for a stereoscopic image to correspond to the user command,
  control the display to display an enlarged image or a shrunk image in which the three-dimensional effect is adjusted, and
  based on the user command being a command for enlarging the stereoscopic image, move a left-eye image of the stereoscopic image leftward, move a right-eye image of the stereoscopic image rightward, generate a left-eye stereoscopic space image and a right-eye stereoscopic space image based on the left-eye image moved leftward and the right-eye image moved rightward, and obtain images corresponding to the user command from each of the left-eye stereoscopic space image and the right-eye stereoscopic space image.

2. The display device of claim 1, wherein the processor is further configured to:
  control to project each of the left-eye image moved leftward and the right-eye image moved rightward into a virtual stereoscopic space to obtain the left-eye stereoscopic space image and the right-eye stereoscopic space image, and
  control the display to display the images corresponding to the user command.

3. The display device of claim 2, wherein the processor, when an entirety shrinking command to shrink an entirety of the stereoscopic image is input, is further configured to:
  move the left-eye image rightward,
  move the right-eye image leftward,
  obtain the left-eye stereoscopic space image and the right-eye stereoscopic space image using each of the left-eye image moved rightward and the right-eye image moved leftward,
  obtain images corresponding to the entirety shrinking command from each of the left-eye stereoscopic space image and the right-eye stereoscopic space image, and
  control the display to display the images corresponding to the entirety shrinking command.

4. The display device of claim 1, wherein the processor is further configured to:
  control to project each of the left-eye image and the right-eye image of the stereoscopic image into a virtual stereoscopic space to obtain the left-eye stereoscopic space image and the right-eye stereoscopic space image,
  control to rotate virtual cameras existing in the left-eye stereoscopic space image and the right-eye stereoscopic space image,
  obtain images corresponding to the user command from each of the left-eye stereoscopic space image and the right-eye stereoscopic space image using the virtual cameras as rotated, and
  control the display to display the images corresponding to the user command.

5. The display device of claim 4, wherein the processor, when a portion enlarging command to enlarge a portion of the stereoscopic image is input, is further configured to:
  control to rotate a virtual camera existing in the left-eye stereoscopic space image rightward,
  control to rotate a virtual camera existing in the right-eye stereoscopic space image leftward,
  obtain images corresponding to the portion enlarging command from each of the left-eye stereoscopic space image and the right-eye stereoscopic space image using the virtual cameras as rotated, and
  control the display to display the images corresponding to the portion enlarging command to be overlaid on the left-eye image and the right-eye image, respectively.

6. The display device of claim 4, wherein the processor, when a portion shrinking command to shrink a portion of the stereoscopic image is input, is further configured to:
  control to rotate a virtual camera existing in the left-eye stereoscopic space image leftward,
  control to rotate a virtual camera existing in the right-eye stereoscopic space image rightward,
  obtain images corresponding to the portion shrinking command from each of the left-eye stereoscopic space image and the right-eye stereoscopic space image using the virtual cameras as rotated, and
  control the display to display the images corresponding to the portion shrinking command to be overlaid on the left-eye image and the right-eye image, respectively.

7. A control method of a display device for providing a virtual reality service, the control method comprising:
  displaying a stereoscopic image;
  based on a user command for enlarging or shrinking the stereoscopic image being input, adjusting a three-dimensional effect for the stereoscopic image to correspond to the user command; and
  displaying an enlarged image or a shrunk image in which the three-dimensional effect is adjusted,
  wherein, if the user command corresponds to a command to enlarge the stereoscopic image, the displaying of the enlarged image comprises moving a left-eye image of the stereoscopic image leftward, moving a right-eye image of the stereoscopic image rightward, generating a left-eye stereoscopic space image and a right-eye stereoscopic space image based on the left-eye image moved leftward and the right-eye image moved rightward, and obtaining images corresponding to the user command from each of the left-eye stereoscopic space image and the right-eye stereoscopic space image.

8. The control method of claim 7, wherein the displaying of the enlarged image or the shrunk image further comprises:
  projecting each of the left-eye image moved leftward and the right-eye image moved rightward into a virtual stereoscopic space to obtain the left-eye stereoscopic space image and the right-eye stereoscopic space image;
  obtaining the images corresponding to the user command from each of the left-eye stereoscopic space image and the right-eye stereoscopic space image; and
  displaying the images corresponding to the user command.

9. The control method of claim 8, wherein, when an entirety shrinking command to shrink an entirety of the stereoscopic image is input, the displaying of the enlarged image or the shrunk image further comprises:
  moving the left-eye image rightward;
  moving the right-eye image leftward;
  obtaining the left-eye stereoscopic space image and the right-eye stereoscopic space image using each of the left-eye image moved rightward and the right-eye image moved leftward;
  obtaining images corresponding to the entirety shrinking command from each of the left-eye stereoscopic space image and the right-eye stereoscopic space image; and
  displaying the images corresponding to the entirety shrinking command.

10. The control method of claim 7, wherein the displaying of the enlarged image or the shrunk image further comprises:
  projecting each of the left-eye image and the right-eye image of the stereoscopic image into a virtual stereoscopic space to obtain the left-eye stereoscopic space image and the right-eye stereoscopic space image;
  rotating virtual cameras existing in the left-eye stereoscopic space image and the right-eye stereoscopic space image;
  obtaining images corresponding to the user command from each of the left-eye stereoscopic space image and the right-eye stereoscopic space image using the virtual cameras as rotated; and
  displaying the images corresponding to the user command.

11. The control method of claim 10, wherein, when a portion enlarging command to enlarge a portion of the stereoscopic image is input, the displaying of the enlarged image or the shrunk image further comprises:

rotating a virtual camera existing in the left-eye stereoscopic space image rightward;

rotating a virtual camera existing in the right-eye stereoscopic space image leftward;

obtaining images corresponding to the portion enlarging command from each of the left-eye stereoscopic space image and the right-eye stereoscopic space image using the virtual cameras as rotated; and displaying the images corresponding to the portion enlarging command to be overlaid on the left-eye image and the right-eye image, respectively.

12. The control method of claim 10, wherein, when a portion shrinking command to shrink a portion of the stereoscopic image is input, the displaying of the enlarged image or the shrunk image further comprises:

rotating a virtual camera existing in the left-eye stereoscopic space image leftward;

rotating the virtual camera existing in the right-eye stereoscopic space image rightward;

obtaining images corresponding to the portion shrinking command from each of the left-eye stereoscopic space image and the right-eye stereoscopic space image using the virtual cameras as rotated; and displaying the images corresponding to the portion shrinking command to be overlaid on the left-eye image and the right-eye image, respectively.

\* \* \* \* \*